(12) United States Patent
Subramanian et al.

(10) Patent No.: US 8,619,733 B2
(45) Date of Patent: Dec. 31, 2013

(54) SELECTION OF WIRELESS NETWORK IN CONJUNCTION WITH SELECTION OF A WIRELESS CELL SET

(75) Inventors: Ramachandran Subramanian, San Diego, CA (US); Gavin B. Horn, La Jolla, CA (US); Osok Song, San Diego, CA (US); Manoj M. Deshpande, San Diego, CA (US); Damanjit Singh, San Diego, CA (US); Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 12/609,426

(22) Filed: Oct. 30, 2009

(65) Prior Publication Data

US 2010/0110987 A1   May 6, 2010

Related U.S. Application Data

(60) Provisional application No. 61/110,733, filed on Nov. 3, 2008, provisional application No. 61/114,943, filed on Nov. 14, 2008, provisional application No. 61/140,588, filed on Dec. 23, 2008, provisional application No. 61/147,415, filed on Jan. 26, 2009.

(51) Int. Cl.
*H04L 12/56* (2006.01)
*H04J 1/16* (2006.01)

(52) U.S. Cl.
USPC .................... 370/338; 370/252; 370/331

(58) Field of Classification Search
USPC ................... 370/252, 331, 329, 338
See application file for complete search history.

(56) References Cited

U.S. PATENT DOCUMENTS 7,177,658 B2   2/2007   Willenegger et al.
7,962,135 B2   6/2011   Cooper
(Continued)

FOREIGN PATENT DOCUMENTS

CN   1191659 A   8/1998
CN   1759628 A   4/2006
(Continued)

OTHER PUBLICATIONS

3GPP: "3GPP TS 22.011 V8.5.0 (Sep. 2008); 3rd Generation Partnership Project; Technical Specification Group Services and System Aspects; Service accessibility; (Release 8)" 3GPP TS 22.011 V8.5.0, vol. 22.011, No. V8.5.0, Sep. 1, 2008, pp. 1-26, XP002554915, Chapter 3.

(Continued)

*Primary Examiner* — John Pezzlo
(74) *Attorney, Agent, or Firm* — François A. Pelaez

(57) ABSTRACT

An access terminal may switch to a different mode of wireless network selection as a result of manual selection of a wireless cell set (e.g., a closed subscriber group) associated with one or more wireless cells. For example, if the user of an access terminal selects a closed subscriber group in a wireless network that is different than the current wireless network, the access terminal may enter a manual mode of wireless network selection, select the wireless network corresponding to the closed subscriber group, and register on a closed subscriber group cell in the selected wireless network. In addition, an access terminal may automatically switch to a different mode of wireless network selection (e.g., the prior mode) upon losing coverage of a wireless cell set. An access terminal may also automatically select a cell of a wireless cell set if the access terminal returns to a cell of the cell set within a defined period of time after losing coverage of the cell set. Furthermore, an access terminal may return to a prior wireless network upon losing coverage of a wireless cell set.

51 Claims, 13 Drawing Sheets

(56) References Cited

U.S. PATENT DOCUMENTS

| | | | |
|---|---|---|---|
| 2007/0054668 | A1 | 3/2007 | Scheinert et al. |
| 2008/0009268 | A1 | 1/2008 | Ramer et al. |
| 2008/0076411 | A1 | 3/2008 | Khetawat et al. |
| 2008/0227447 | A1 | 9/2008 | Jeong et al. |
| 2008/0267153 | A1 | 10/2008 | Mukherjee et al. |
| 2009/0047960 | A1* | 2/2009 | Gunnarsson et al. ......... 455/436 |
| 2009/0245176 | A1 | 10/2009 | Balasubramanian et al. |
| 2009/0268668 | A1* | 10/2009 | Tinnakornsrisuphap et al. .............. 370/328 |
| 2010/0020745 | A1* | 1/2010 | Agulnik et al. ............... 370/328 |
| 2010/0029274 | A1* | 2/2010 | Deshpande et al. ....... 455/435.3 |
| 2010/0113020 | A1 | 5/2010 | Subramanian et al. |
| 2010/0161794 | A1 | 6/2010 | Horn et al. |
| 2010/0216469 | A1* | 8/2010 | Yi et al. ..................... 455/435.3 |
| 2012/0076018 | A1* | 3/2012 | Singh et al. .................. 370/252 |

FOREIGN PATENT DOCUMENTS

| | | |
|---|---|---|
| CN | 101166133 A | 4/2008 |
| JP | 9331567 A | 12/1997 |
| JP | 10174155 A | 6/1998 |
| JP | 11506278 A | 6/1999 |
| JP | 2002532989 A | 10/2002 |
| KR | 20070008537 A | 1/2007 |
| RU | 2199183 C2 | 2/2003 |
| RU | 2317646 C2 | 2/2008 |
| TW | 200840388 A | 10/2008 |
| WO | WO9638992 A1 | 12/1996 |
| WO | 9941923 A1 | 8/1999 |
| WO | WO2004073338 | 8/2004 |
| WO | 2005004403 A1 | 1/2005 |
| WO | WO2008008987 | 1/2008 |
| WO | 2009115897 A1 | 9/2009 |
| WO | WO2009134625 A2 | 11/2009 |

OTHER PUBLICATIONS

International Search Report and Written Opinion—PCT/US2009/063180, International Search Authority—European Patent Office, Mar. 16, 2010.

International Search Report and Written Opinion—PCT/US2009/063181, International Search Authority—European Patent Office, Apr. 23, 2010.

International Search Report and Written Opinion—PCT/US2009/069333—International Search Authority—European Patent Office, Jun. 4, 2010.

Samsung: "P-CR: Updating Option A of Home cell deployments" 3GPP Draft; C1-073133 Updating CSG Option A, 3RD Generation Partnership Project (3GPP), Mobile Competence Centre; 650, Route Des Lucioles; F-06921 Sophia-Antipolis Cedex; France, vol. CT WG1, No. Sophia Antipolis, France; 20071112, Nov. 12, 2007, XP050027286, paragraph [10.12.2.4].

"Universal Mobile Telecommunciations System (UMTS) Evolved Universal Terrestrial Radio Access (E-UTRA) and Evolved Universal Terrestrial Radio Access Network (E-UTRAN; Overall description; Stage 2 (3GPP TS 36.300 version 8.6.0 Release 8); ETSI TS 136 300" ETSI Standard, European Telecommunications Standards Institute (ETSI), Sophia Antipolis Cedex, France, vol. 3-R2, No. V8.6.0, Oct. 1, 2008, XP014042629, Paragraph 10.5.

3GPP TR 24.801: "Pseudo-CR on Allowed CSG List update," 3GPP TSG CT WG1 meeting #55; C2-083427, v 1.1.1, Budapast, Hungary, Aug. 18-22, 2008.

Taiwan Search Report—TW098137327—TIPO—Nov. 30, 2012.

Teliasonera on Behalf of H(E)NB SWG: "Correction of allowed CSGs", S1-090334, 3GPP TSG-SA1 #44, Feb. 2, 2009.

* cited by examiner

SELECTION OF WIRELESS NETWORK IN CONJUNCTION WITH SELECTION OF A WIRELESS CELL SET

CLAIM OF PRIORITY

This application claims the benefit of and priority to commonly owned U.S. Provisional Patent Application No. 61/110,733, filed Nov. 3, 2008, and assigned; U.S. Provisional Patent Application No. 61/114,943, filed Nov. 14, 2008, and assigned; U.S. Provisional Patent Application No. 61/140,588, filed Dec. 23, 2008, and assigned; and U.S. Provisional Patent Application No. 61/147,415, filed Jan. 26, 2009, and assigned; the disclosure of each of which is hereby incorporated by reference herein.

CROSS-REFERENCE TO RELATED APPLICATION

This application is related to concurrently filed and commonly owned U.S. patent application Ser. No. 12/609,419, entitled "SWITCHING WIRELESS NETWORK SELECTION MODES IN CONJUNCTION WITH SELECTION OF A WIRELESS CELL SET," and assigned, the disclosure of which is hereby incorporated by reference herein.

BACKGROUND

1. Field

This application relates generally to wireless communication and more specifically, but not exclusively, to wireless network selection.

2. Introduction

A geographic area may be served by overlapping public land mobile networks (PLMNs) that provide mobile cellular services. For example, different wireless network operators may deploy different PLMNs throughout the same city. Under certain circumstances, a given access terminal (e.g., a cell phone) may be allowed to access these different PLMNs. Accordingly, such an access terminal may be configured to select which PLMN is to be used at a given point in time.

In some cases, an access terminal may employ an automatic mode of PLMN selection. Here, the access terminal may continually monitor for available PLMNs and automatically switch to a new PLMN based on specified selection criteria. In a typical case, the selection criteria comprise a prioritized list of PLMNs that indicates the order in which the access terminal is to select a PLMN in the event multiple PLMNs are available. Other types of selection criteria may be used as well. For example, priority may be given to a PLMN that would currently provide the best quality of service for the access terminal.

In some cases, an access terminal may employ a manual mode of PLMN selection. For example, a list of currently available PLMNs may be displayed on a screen of the access terminal. The user may then select one of the PLMNs and the access terminal switches to that PLMN. In contrast with an automatic PLMN selection mode, in this case the access terminal will stay on this PLMN even if other higher priority PLMNs are available. For example, the access terminal may stay on the selected PLMN until a different PLMN is manually selected or until the selected PLMN no longer provides service to the access terminal.

An access terminal also may be configured to enable a user to manually select a closed subscriber group (CSG) associated with one or more wireless cells (e.g., at least one access point). In the event the selected CSG is in a different PLMN than the current PLMN, a PLMN selection procedure may be invoked in response to the selection of the CSG. In such a case, the PLMN selection procedure may not provide a desirable result.

For example, an access terminal operating in automatic PLMN selection mode may not be able to remain camped on a selected CSG. This may be the case because the automatic PLMN selection mode may automatically switch to another PLMN based the designated selection criteria (e.g., if a background search procedure detects a higher priority PLMN).

In addition, an access terminal operating in manual PLMN selection mode may attempt to remain on the new serving PLMN even after the access terminal has left the coverage area of the selected CSG cell. In the event no suitable cell is found for the access terminal on that PLMN (e.g., the access terminal is not allowed to access any cell other than the cells of the selected CSG), the user will be without service. As a result, user interaction will be required to select another PLMN.

SUMMARY

A summary of sample aspects of the disclosure follows. In the discussion herein, a reference to the term aspects may refer to one or more aspects of the disclosure.

The disclosure relates in some aspects to switching to a different mode of wireless network (e.g., PLMN) selection as a result of manual selection of a wireless cell set (e.g., a CSG) associated with one or more wireless cells. For example, upon manual selection of a cell advertising a CSG, an access terminal may switch to a different mode of wireless network selection if the wireless network associated with the selected cell is different from the currently registered wireless network or a currently preferred wireless network. As a specific example, if the user of an access terminal selects a CSG in a PLMN that is different from the current PLMN, the access terminal may maintain a record of the current PLMN and a record of the current mode of PLMN selection, and enter a manual mode of PLMN selection. The access terminal may then select the PLMN corresponding to the CSG and register on a CSG cell in that PLMN. In this way, the access terminal may be more likely to remain on the selected PLMN since the access terminal will not be operating in an automatic mode of PLMN selection until some later point in time (e.g., in response to some other trigger).

The disclosure relates in some aspects to switching to a different mode of wireless network selection upon losing coverage of a wireless cell set. For example, upon determining that an access terminal is no longer camped on a cell of a CSG that was manually selected by the access terminal, the access terminal may switch to a different mode of wireless network selection (e.g., the mode that was used prior to camping on the CSG). In this way, the access terminal may likely end up selecting a more appropriate network upon leaving the coverage of the CSG.

The disclosure relates in some aspects to automatically selecting a cell of a wireless cell set if an access terminal returns to a cell of the cell set within a defined period of time after losing coverage of the cell set. For example, a timer may be started upon determining that an access terminal is no longer camped on a cell of a CSG that was manually selected by the access terminal. In the event the access terminal returns to a cell of the CSG within a defined period of time, the cell may be automatically selected (e.g., without user interaction) for camping by the access terminal. In this way, the access terminal may seamlessly reestablish access to the CSG in the event the access terminal briefly lost the coverage of the CSG.

The disclosure relates in some aspects to returning to a prior wireless network upon losing coverage of a wireless cell set. For example, upon determining that an access terminal is no longer camped on a cell of a CSG that was manually selected by the access terminal, the access terminal may automatically return to the PLMN that the access terminal was on prior to camping on the CSG.

BRIEF DESCRIPTION OF THE DRAWINGS

These and other sample aspects of the disclosure will be described in the detailed description and the appended claims that follow, and in the accompanying drawings, wherein:

Figure 1:
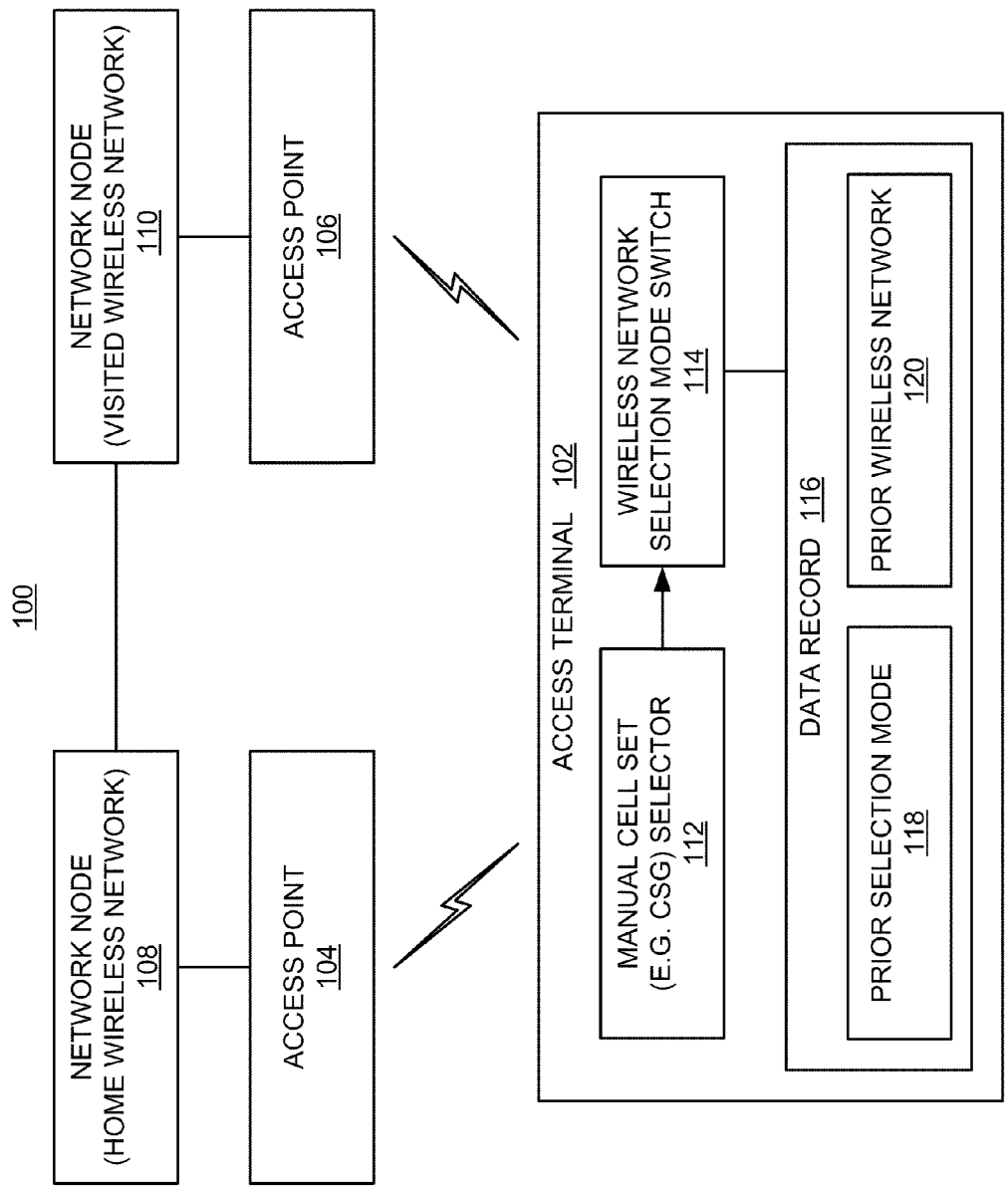
FIG. 1 is a simplified block diagram of several sample aspects of a communication system adapted to switch modes of wireless network selection and wireless networks in conjunction with manual selection of a cell set (e.g., CSG)

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations, access points may be referred to or implemented as base stations or eNodeBs, access terminals may be referred to or implemented as user equipment or mobiles, and so on.

Access points in the system 100 provide one or more services (e.g., network connectivity) for one or more wireless terminals that may be installed within or that may roam throughout a coverage area of the system 100. For example, at various points in time, the access terminal 102 may connect to an access point 104, an access point 106, or some other access point (not shown). Each access point in the system 100 may communicate with one or more network entities (represented, for convenience, by network nodes 108 and 110) to facilitate wide area network connectivity. These network entities may take various forms such as, for example, one or more radio and/or core network entities. Thus, in various implementations, the network nodes 108 and 110 and may represent functionality such as at least one of: mobility management, network management (e.g., via an operation, administration, management, and provisioning entity), call control, session management, gateway functions, interworking functions, or some other suitable network functionality.

The access terminal 102 includes functionality (represented by manual cell set selector 112) to enable a user of the access terminal to manually select a wireless cell set. In general, a wireless cell set comprises a set of one or more cells (e.g., at least one access point) where there is a defined relationship specific to that set. One example of a wireless cell set is a CSG (described in more detail below). For convenience, the discussion that follows may simply refer to the term CSG, rather than the more general term wireless cell set. It should be appreciated, however, that the described concepts may be applicable to other types of defined sets or groups of wireless cells or other similar entities.

To facilitate wireless network (e.g., PLMN) selection, the access terminal 102 includes a wireless network selection mode switch 114 that may switch to a different mode of wireless network selection in response to the manual selection of a CSG in a different network. Here, different modes of wireless network selection may be defined in various ways. In some implementations, automatic and manual modes of wireless network selection may be defined. In some implementations, one mode may be defined to be used when an access terminal is camping on a macro cell while another mode may be defined to be used when the access terminal is camping on a CSG cell. Other types of modes may be used in other implementations. In the example of FIG. 1, the access point 104 may comprise a cell of a home wireless network (e.g., a home PLMN) for the access terminal 102 while the access point 106 may comprise a CSG cell of a visited wireless network (e.g., visited PLMN). If the access terminal 102 was in an automatic mode of wireless network selection prior to the manual selection of the CSG, the switch 114 may automatically switch to a non-automatic mode (e.g., a manual mode) of wireless network selection. In this way, the access terminal 102 may remain camped on the selected CSG even if other higher priority wireless networks are able to serve the access terminal 102.

The access terminal 102 also include a data record 116 (i.e., a data memory) for storing state information for the network selection procedures. For example, a record of a previously used wireless network selection mode (prior selection mode 118) may be maintained so that the switch 114 may automatically switch back to the prior mode of wireless network selection if the access terminal loses (e.g., leaves) the wireless coverage of the selected CSG. Similarly, a record of a previously used wireless network (prior wireless network 120) may be maintained so that the access terminal 102 may automatically switch back to the prior wireless network if the access terminal loses (e.g., leaves) the wireless coverage of the selected CSG.

Figure 2:
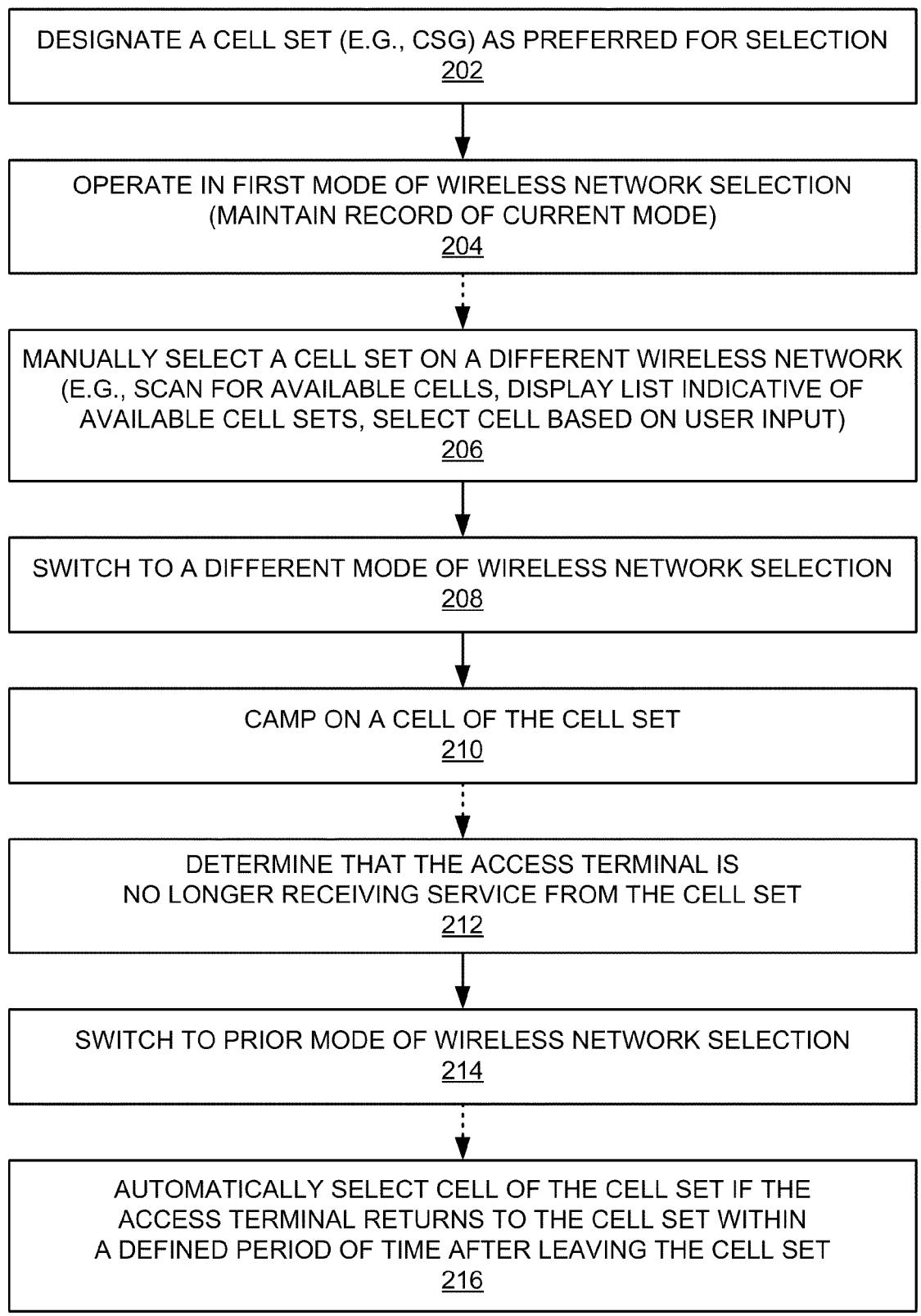
FIG. 2 is a flowchart of several sample aspects of operations that may be performed to switch wireless network selection modes and wireless networks in conjunction with manual selection of a cell set.

Sample operations of the system 100 will now be described in more detail in conjunction with the flowchart of FIG. 2. For convenience, the operations of FIG. 2 (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

As represented by block 202, in some implementations, one or more cells sets (e.g., CSGs) may be designated as being preferred for selection for an access terminal. For example, a user may prefer to access a certain CSG if that CSG is available. Accordingly, a record of this preferred CSG may be maintained on the access terminal to facilitate selecting that CSG in the event the access terminal enters the coverage of that CSG.

As represented by block 204, at various points in time, an access terminal may utilize a first mode of wireless network selection (e.g., an automatic mode or a macro cell specific mode) during idle mode operation. For example, the access terminal may operate in an automatic mode of wireless network selection whereby the access terminal automatically selects the best available wireless network on a repeated basis (e.g., by operation of a background procedure that search for PLMNs). Such a selection procedure may employ a list that specifies one or more preferred wireless networks (e.g., a prioritized list that ranks PLMNs in priority order). Thus, whenever the access terminal detects a higher priority wireless network, the access terminal may automatically select that network. In a typical case, a user's home wireless network may be assigned the highest priority (e.g., designated as being the preferred wireless network), while others wireless networks that the user is authorized to access may have lower priority.

The access terminal may maintain a record of the current mode of wireless network selection. As mentioned above, this record may be used to facilitate efficiently switching back to this mode at some later point in time.

As represented by block 206, at some point in time, a user of the access terminal may manually select a CSG that is on a different wireless network. For example, the user may use a user input device of the access terminal to activate a manual CSG selection mode. A user may wish to manually select a CSG to, for example, obtain a service uniquely provided by the CSG. For example, the CSG may be deployed by a third party (e.g., a retailer) to provide free coverage for customers or provide coverage on a fee basis.

Upon activation of this mode, the access terminal may then scan for available cells advertising at least one CSG. For example, the access terminal may monitor for signals from nearby access points and determine whether any of these access points are broadcasting signals that indicate that the access point is associated with one or more CSGs.

Upon identifying one or more cells associated with one or more CSGs, the access terminal may display a corresponding list on a display device of the access terminal. In some aspects, this list may comprise at least one identifier corresponding to any available cells advertising at least one CSG. For example, for each CSG that was detected, the list may comprise one or more of: an identifier of the CSG, an identifier of a cell advertising the CSG, or an identifier of the wireless network (e.g., PLMN) of the cell advertising the CSG. In a case where multiple cells are advertising the same CSG, the access terminal may list all of these cells or some of these cells (e.g., the cell associated with the highest received signal strength at the access terminal).

The user may then use a user input device to select one of the items from the list (e.g., one of the CSGs). Accordingly, the access terminal may select one of the available cells based on an indication from the user input device. For example, if there is only one cell advertising the CSG selected by the user, the access terminal will select that cell (e.g., select the cell for camping by the access terminal). If there are multiple cells advertising the CSG selected by the user, the access terminal may select the cell from that set of cells that provides the highest received signal strength, the highest quality of service for the access terminal, or some other desired attribute. As discussed above, in some cases, a CSG may be designated as preferred for selection. In such a case, the selection of the cell may be based on this designation.

As represented by block 208, as a result of the manual selection of a CSG on a different wireless network, the access terminal may switch to a different mode of wireless network selection (e.g., a manual mode or a CSG cell specific mode). For example, the access terminal may switch to a non-automatic (e.g., manual) mode of wireless network selection. In this way, a selection of the wireless network of the CSG cell (that results from the manual selection of the CSG) will not be subsequently overridden as could happen if the access terminal remained in the automatic mode of wireless network selection.

As represented by block 210, in conjunction with the selection of the cell at block 206, the access terminal camps on the selected cell. In some aspects, camping on a cell may comprise one or more of: receiving pages from the cell, establishing communication with the cell, or decoding broadcast transmissions from the cell.

As represented by block 212, at some point in time, the access terminal may determine that it is no longer receiving service from the CSG (e.g., by determining that the access terminal is no longer camping on any cell of the CSG). Here, service may be lost, for example, due to the access terminal moving out of the service area of the cell(s) advertising the CSG, the access terminal being subjected to interference that causes a loss in service, or the access terminal losing service for some other reason.

As represented by block 214, upon determining that the access terminal is no longer receiving service from the CSG, the access terminal may automatically (e.g., without requiring action by the user) switch its mode of wireless network selection. For example, the access terminal may switch back to the mode of operation specified by the record maintained at block 204 (e.g., an automatic mode of PLMN selection). As discussed above, this may correspond to the mode of operation that was in use immediately before manual selection of the CSG.

By automatically switching to a prior mode of wireless network selection in this manner, the access terminal may, for example, avoid staying on a wireless network (e.g., a visited PLMN) from which service is not available or avoid requiring user intervention to prevent loss of coverage. For example, in some cases a wireless network may allow the access terminal to access cells of the CSG, but no other cells on that wireless network. In these cases, upon leaving the coverage of the CSG, the access terminal could fall out of coverage if it had stayed in the manual mode of wireless network selection (e.g., the access terminal would remain on the selected wireless network). While this issue could be addressed by automatically requesting the user to choose another wireless network, the teachings herein may be advantageously employed to maintain coverage without requiring user intervention.

As represented by block 216, the access terminal may be configured to automatically select a cell of the CSG if the access terminal returns to the wireless coverage of the CSG within a defined period of time. For example, if the access terminal enters wireless coverage of a cell advertising the CSG within a defined period of time after the determination of block 212, the access terminal may automatically select that cell and commence camping on that cell. Thus, in the event the access terminal temporarily loses the CSG service, the service may be reacquired without requiring user intervention.

Figure 3:
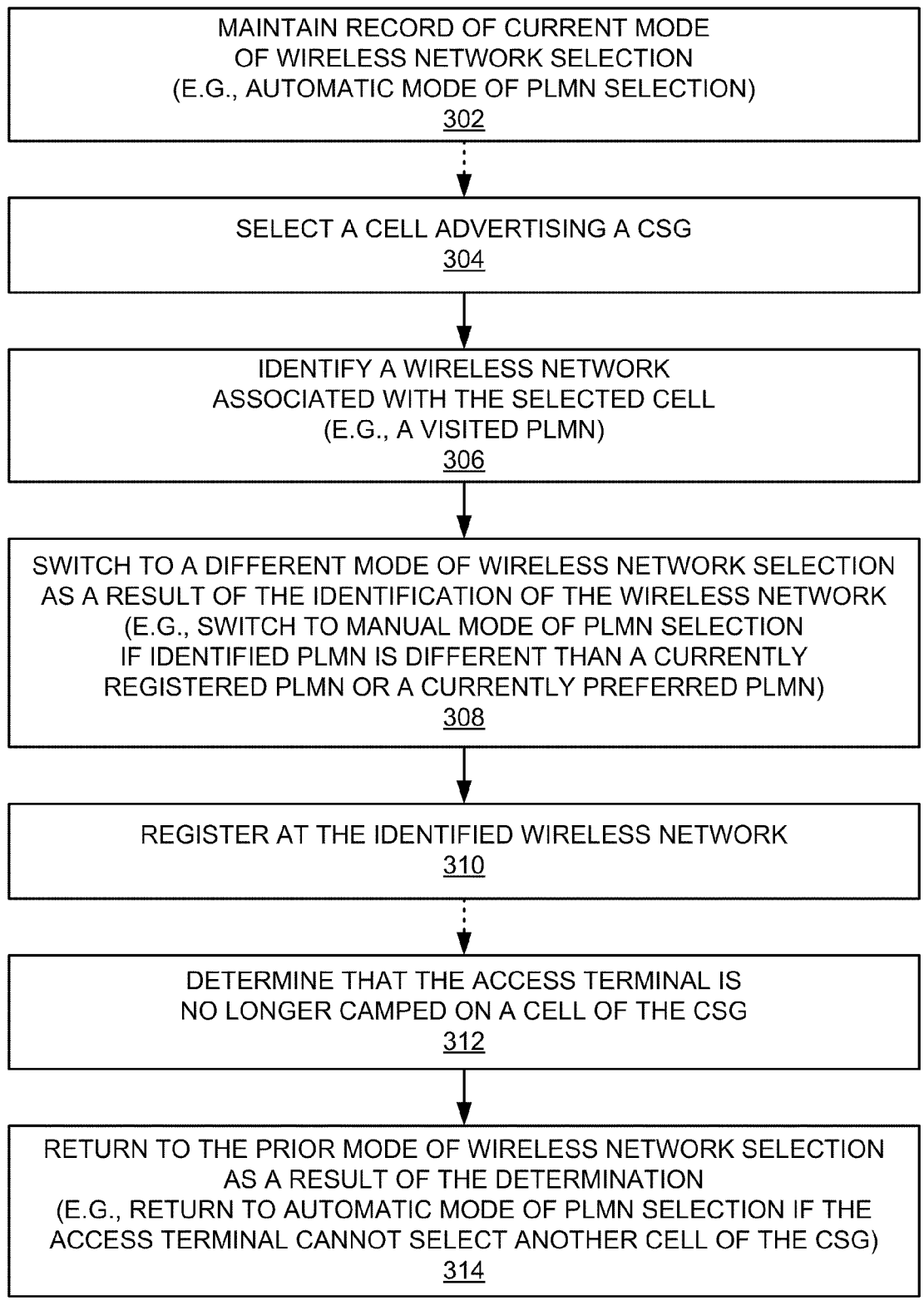
FIG. 3 is a flowchart of several sample aspects of operations that may be performed in conjunction with switching to a different wireless network selection mode upon manual selection of a cell set on a different wireless network and/or upon ceasing camping on a cell set.
Figure 4:
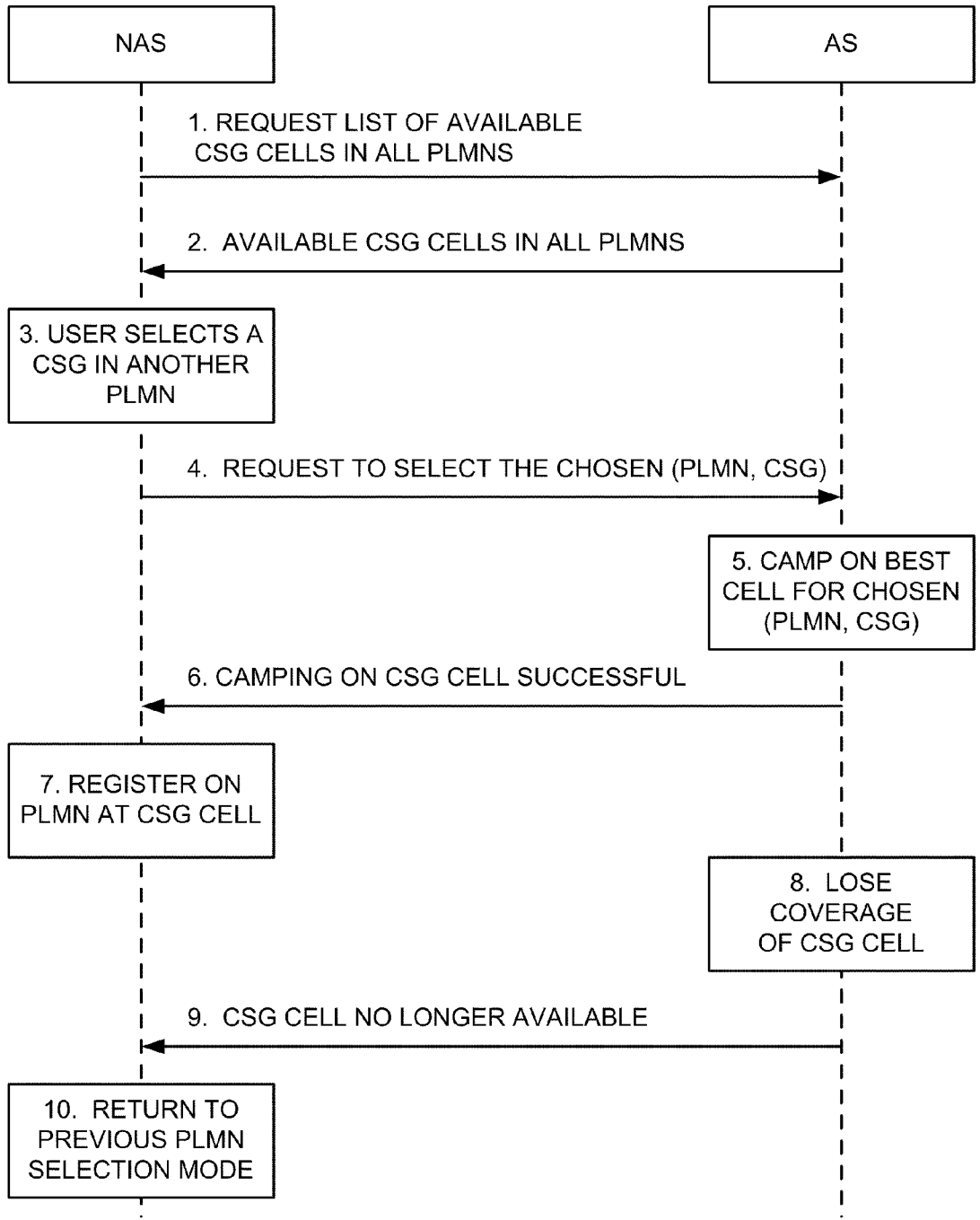
FIG. 4 is a simplified diagram illustrating sample non-access stratum and access stratum call flow that may be used in conjunction with performing manual selection of a cell set on a different wireless network and switching to a different wireless network selection mode.
Figure 5:
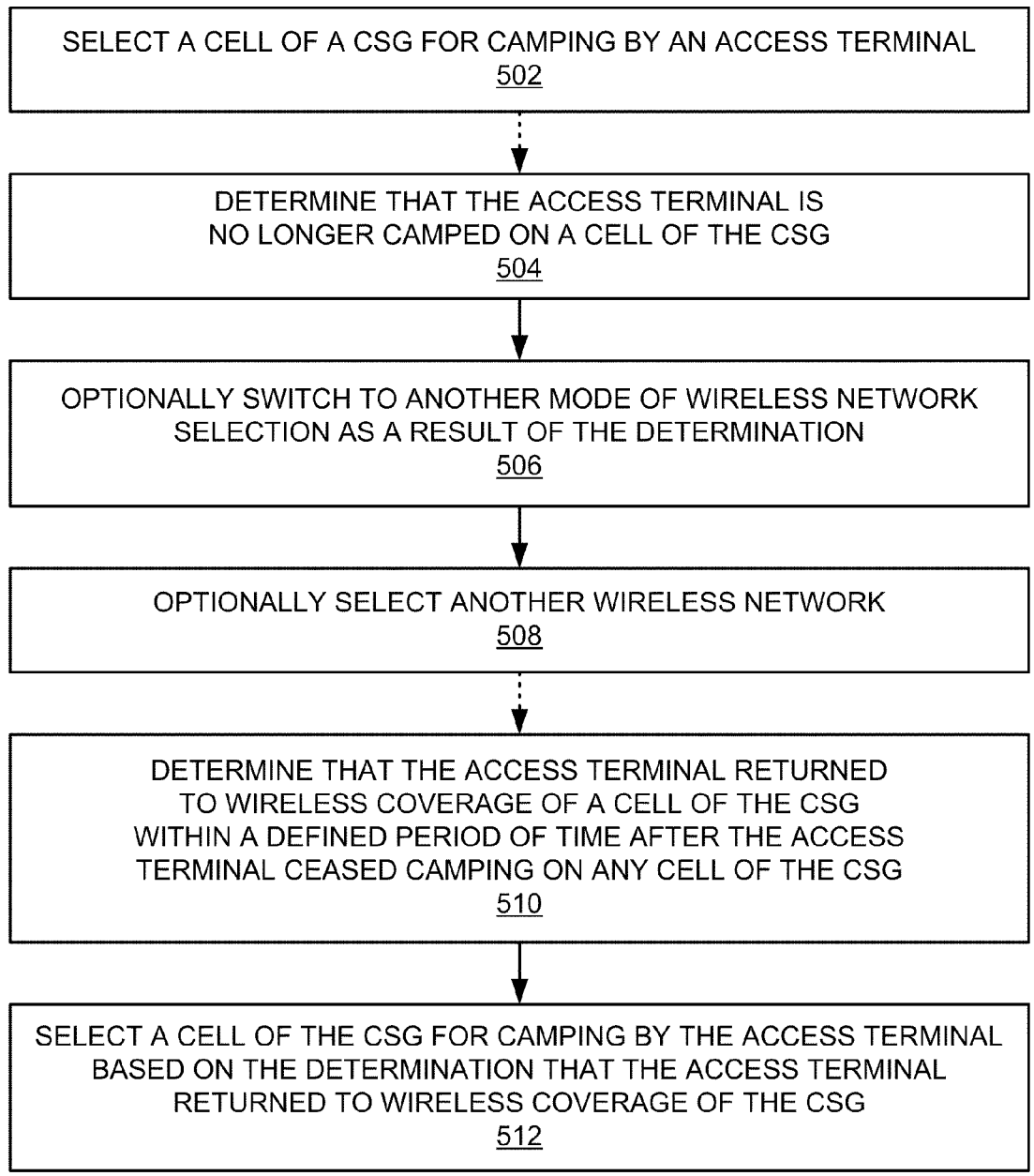
FIG. 5 is a flowchart of several sample aspects of operations that may be performed in conjunction with automatically reselecting a cell set if an access terminal returns to the cell set within a defined period of time.
Figure 6:
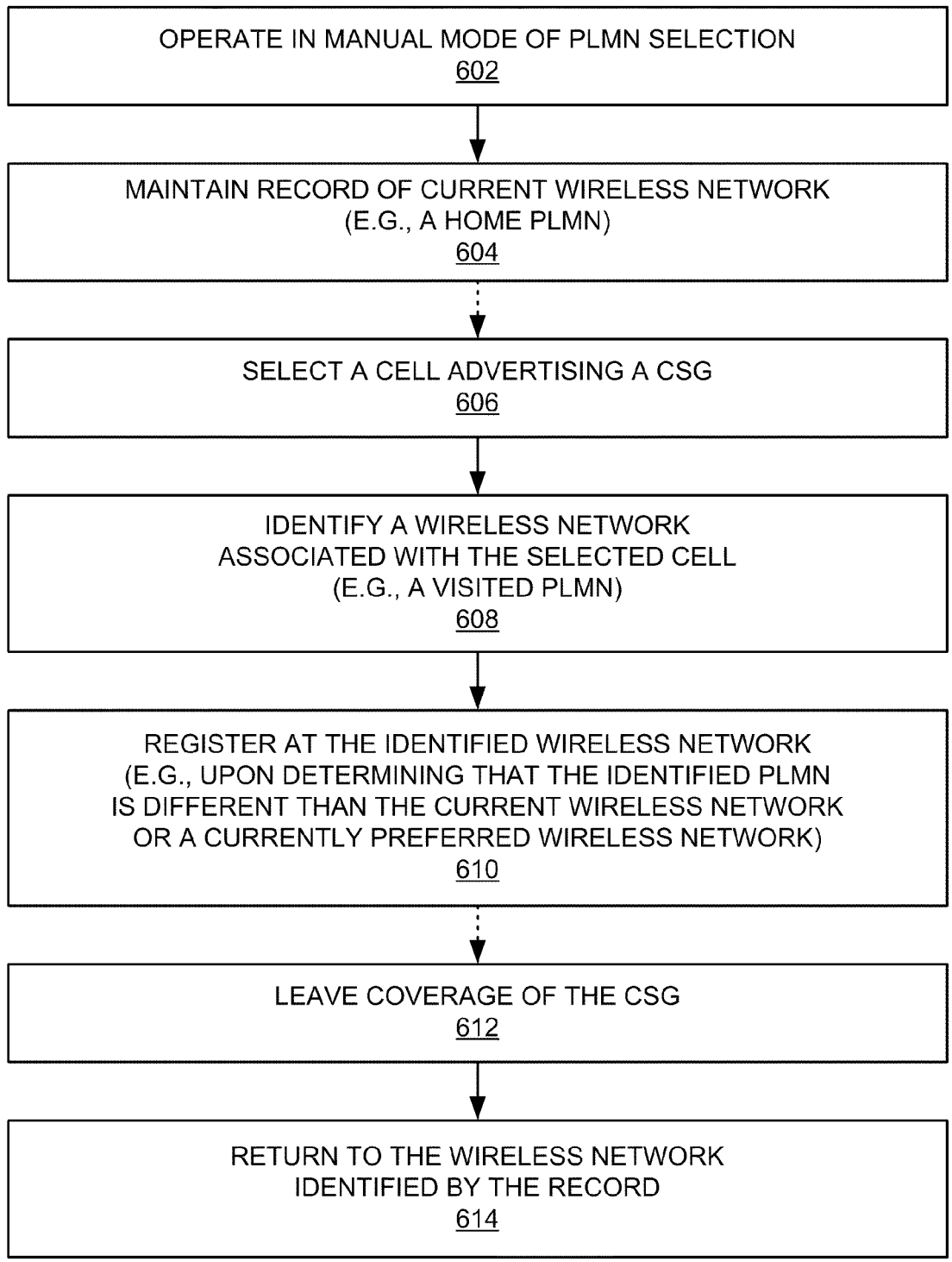
FIG. 6 is a flowchart of several sample aspects of operations that may be performed in conjunction with automatically returning to a wireless network upon leaving coverage of a cell set.
Figure 7:
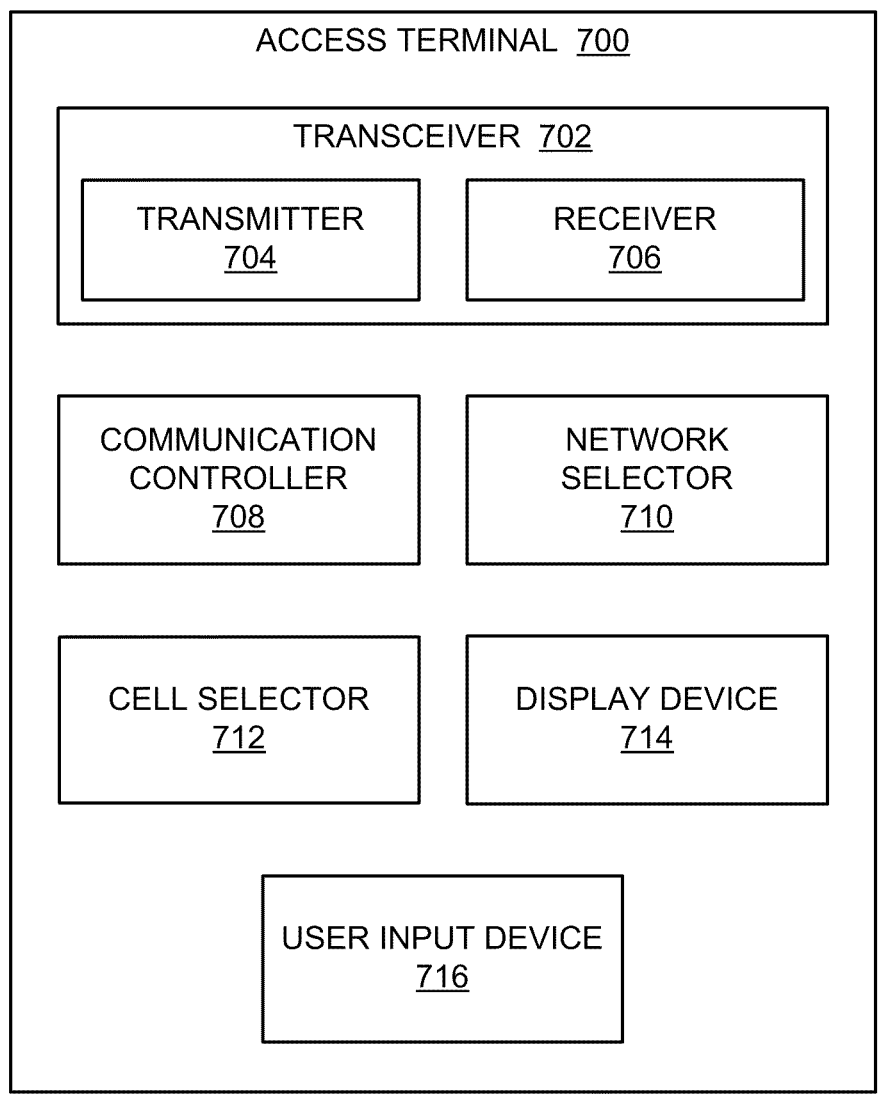
FIG. 7 is a simplified block diagram of several sample aspects of components that may be employed in a communication node.

Sample implementations of the above procedures will now be described with reference to FIGS. 3-7. FIGS. 3 and 4 describe sample operations that may be performed in conjunction with wireless network selection or the switching of the selection mode. FIG. 5 describes sample operations that may be performed in conjunction with returning to a CSG within a defined period of time. FIG. 6 describes sample operations that may be performed in conjunction with returning to a prior wireless network. FIG. 7 describes sample functional components that may be used to perform the operations taught herein.

As represented by block 302 of FIG. 3, the access terminal maintains a record of the current mode of wireless network selection. Thus, during normal operation, the record is updated whenever the access terminal switches its selection mode. As mentioned above, an access terminal may usually operate in an automatic mode (or a macro cell specific mode) of wireless network selection.

As represented by block 304, at some point in time the access terminal selects a cell advertising a CSG. These operations may correspond to, for example, the operations described above at block 206.

As represented by block 306, the access terminal identifies the wireless network associated with the selected cell. For example, the access terminal may determine which PLMN the selected cell is on. In some cases, the identified network may be considered to be a visited network from the perspective of the access terminal. For example, the selected cell may be on a wireless network that is different than the currently registered wireless network (i.e., the wireless network at which the access terminal is currently registered). Also, if the access terminal is not currently registered on any wireless network, the selected cell may be on a wireless network that is different from a currently preferred wireless network (e.g., the user's home wireless network).

As represented by block 308, the access terminal may switch from the current mode of wireless network selection to a different mode of wireless network selection as a result of the identification of the wireless network at block 306. As discussed above, the access terminal may switch to a non-automatic mode (or a CSG cell specific mode) of wireless network selection if the user selected a CSG on a different wireless network. For example, the access terminal may switch to a manual selection mode if the identified wireless network (e.g., a visited network) is different that the currently registered wireless network (e.g., a home network) or the currently preferred wireless network (e.g., a home network). Upon switching selection modes in this case, the access terminal does not record the new selection mode as the "current" selection mode (described at block 302). Rather, as discussed below, the "current" selection mode record is left unchanged so that the access terminal may later determine the mode that was in use prior to the selection of the CSG at block 304. As an alternative, the access terminal may record the new selection mode as the "current" selection mode and the previous current selection mode as the "last" selection mode.

Once the access terminal successfully establishes communication with the selected cell, the access terminal may register at the identified network (block 310) via the selected cell and camp on the cell to receive pages, data, and broadcast information. In addition, in the event multiple cells are advertising the CSG, the access terminal may switch to a different cell of the CSG (e.g., upon moving to a different floor of the retailer providing the CSG service). At some point in time, however, the access terminal may not be able to select any cell of the CSG (e.g., the user may have left the store that provided the CSG service). Accordingly, as represented by block 312, the access terminal may determine that it is no longer camping on a cell of the CSG (e.g., it is not camping on any of the cells advertising the CSG).

As represented by block 314, the access terminal may switch to a different mode of wireless network selection as a result of the determination of block 312. As mentioned above, the switch may be predicated on a determination that the access terminal cannot select any cell of the CSG. In addition, in some cases the switch may be predicated on a determination that the access terminal cannot select any other cell of the identified wireless network (e.g., the wireless network only allows the access terminal to access cells of the CSG).

As mentioned above, upon leaving the CSG, the access terminal may switch from the manual mode of wireless network selection to the prior mode specified by the record maintained at block 302 (e.g., automatic mode). Upon returning to automatic mode, the access terminal will likely reselect the wireless network (e.g., a home wireless network) that the access terminal was on prior to the manual selection of the CSG.

The operations of FIG. 3 may be implemented in various ways. FIG. 4 illustrates sample non-access stratum (NAS) and access stratum (AS) procedures that may be employed to achieve PLMN selection mode switching.

At step 1, the user requests CSG manual selection which triggers the NAS in the access terminal to request a list of available CSG cells across all PLMNs. Here, manual selection may apply to CSG cells both in and out of the access terminal's allowed CSG list (e.g., whitelist) and any operator CSG list.

At step 2, in response to the NAS request, the AS scans all radio frequency (RF) channels according to its capabilities and returns a list of available CSG cells for a user to select from across all PLMNs. For example, the access terminal may scan the UTRA and/or E-UTRA bands according to its capabilities to find available CSG identifiers (IDs).

On each carrier, the AS may search (at least) for the strongest cell, read its system information and report available CSG ID(s) belonging to the registered PLMN together with their Home NodeB (HNB) name, if available, to the NAS for a user to select from. The search for available CSG IDs may be stopped on request of the NAS.

At step 3, the access terminal displays to the user all the CSGs that are available and the associated PLMNs. The access terminal also may indicate the text-based HNB name if available. The available CSG IDs may be displayed, for example, in the following order: 1) The CSG IDs that are contained in the allowed CSG list; 2) The CSG IDs that are contained in the operator CSG list; 3) Any other CSG ID not included in the allowed CSG list or the operator CSG list.

When there are multiple cells with the same CSG ID on the same PLMN, only the HNB name of the strongest cell for that CSG ID is displayed in some implementations. The access terminal may also display other information such as the signal strength of the CSG cell and whether the CSG cell belongs to the current PLMN. For example, an access terminal may use signal strength bars to indicate that it has detected the presence of the CSG cell. However, the access terminal may decide to not select that cell due to unsuitable RF conditions. The access terminal will generally not display a PLMN for which there is no CSG cell available for selection.

At step 4, the NAS requests the AS to camp on the manually selected (PLMN, CSG) pair.

At step 5, the AS performs the reselection procedures required to camp on the best cell in that PLMN for that CSG by searching for an acceptable or suitable cell belonging to the selected CSG ID.

At step 6, the AS returns an indication that camping on the CSG cell was successful, including details of the CSG cell such as the CSG ID, tracking area code, location area code, and routing area code.

At step 7, if the user selects a CSG cell within the same PLMN it is currently camped on, and the CSG cell has a CSG ID not in the access terminal's allowed CSG list, the access terminal may perform a location registration procedure (e.g., location area update, routing area update, tracking area update). If the location registration procedure is successful, the access terminal may add the CSG to the allowed CSG list.

If the user selects a CSG cell in a PLMN that is different from the registered PLMN (RPLMN), then the following applies: 1) The access terminal stores a duplicate of the RPLMN and a duplicate of the current PLMN selection mode; 2) The access terminal enters into a manual mode of PLMN selection; 3) The access terminal selects the PLMN corresponding to the CSG and attempts to register on the selected CSG cell in the PLMN; 4) If the registration fails, the access terminal returns to the stored duplicate PLMN selection mode and uses the stored duplicate value of RPLMN and initiates the procedures to reselect to a cell on the appropriate PLMN including registering on the PLMN.

If the registration attempt is accepted, the access terminal may add the CSG identity to the allowed CSG list, unless the cell is a hybrid cell or the identity is already present in the list.

At step 8, the access terminal loses coverage of the CSG or other RF conditions cause the access terminal to move out of coverage of cell(s) belonging to the selected CSG.

At step 9, the AS informs the NAS that a CSG cell with the same CSG ID is no longer available for reselection.

At step 10, if the user selects a CSG cell in a PLMN that is different from the RPLMN and the access terminal is no longer in the coverage of the CSG, the access terminal returns to the stored duplicate PLMN selection mode and uses the stored duplicate value of RPLMN and initiates procedures to reselect to a cell on the appropriate PLMN, including registering on the PLMN.

Referring now to FIG. 5, in some implementations, an access terminal may be configured to automatically reselect the CSG if it returns to the CSG within a defined period of time. As represented by blocks 502 and 504, an access terminal may select a cell of a CSG for camping, switch the mode of wireless network selection (e.g., to manual mode), camp on the cell, and then at some later point in time cease camping on the cell. Thus, the operations of blocks 502 and 504 may correspond, for example, to the operations described above at blocks 202-212 and/or blocks 302-312.

As represented by block 506, the access terminal may switch to another mode of wireless network selection (e.g., to the automatic mode or the macro cell specific mode) as a result of the determination that the access terminal is no longer camped on a cell of the CSG. These operations may thus correspond, for example, to the operations described above at blocks 214 and/or 314.

As represented by block 508, the access terminal may or may not acquire other service upon leaving the CSG. In some cases, upon cessation of camping on any cell of the CSG and switching the mode of wireless network selection, the access terminal will detect and select a wireless network (e.g., a home wireless network) that is different from the wireless network of the cell selected at block 502.

As represented by block 510, the access terminal may keep track of whether it has returned to the coverage of the CSG within a defined period of time after leaving the coverage. For example, a timer may be started once it is determined that the access terminal has ceased camping on any cell of the CSG. The access terminal may then commence monitoring to determine whether it returns to the wireless coverage of a cell of the CSG before the timer expires (i.e., within the defined period of time)

As represented by block 512, if it is determined that the access terminal has returned to the wireless coverage of a cell of the CSG within the defined period of time, the access terminal may select that cell of the CSG for establishing communication. In some aspects, the selection of the cell for establishing communication may comprise, for example, accessing the cell and/or camping on the cell (e.g., to receive one or more of: pages, data, or broadcast information from the cell).

In conjunction with this selection of the cell, the access terminal may also reselect the wireless network of the cell and switch to a different mode of wireless network selection (e.g., return to the manual mode or the CSG cell specific mode). Advantageously, the selection of the cell and the wireless network and the mode switch may be performed automatically, without intervention of the user (e.g., without requiring the user to perform a manual selection).

Referring now to FIG. 6, in some implementations, an access terminal may be configured to automatically return to a prior wireless network. As represented by block 602, at some point in time an access terminal may operate in a mode of wireless network selection that enables a specific wireless network to be selected. For example, the access terminal may support a manual mode of wireless network selection whereby a user may select a wireless network from a set of wireless networks that were detected by the access terminal (e.g., and presented to the user via a list displayed on a display screen).

As represented by block 604, the access terminal maintains a record of the currently selected wireless network. This wireless network may comprise, for example, a home wireless network, a visited wireless network, or some other type of wireless network.

As represented by blocks 606 and 608, at some point in time the access terminal may select a cell advertising a CSG and identify the wireless network (e.g., a visited wireless network) associated with the selected cell. Accordingly, the operations of blocks 606 and 608 may correspond to, for example, the operations described above at blocks 304-308.

As represented by block 610, in some cases the access terminal may register at the identified wireless network. For example, registration may be performed if the identified wireless network is different than the wireless network discussed at block 604 (the "current" wireless network), if the identified wireless network is different than a currently preferred wireless network, or if the access terminal is not registered at any network.

As represented by block 612, at some point in time, the access terminal may leave the coverage of the CSG. For example, as discussed above at block 212 and/or 312, it may be determined that the access terminal is no longer camping on any cell of the CSG.

As represented by block 614, the access terminal may then return to the wireless network identified by the record maintained as described above at block 604. For example, upon determining that a manual mode of wireless network selection was employed immediately prior to selecting the cell at block 606 (e.g., by referencing the maintained record of the selection mode as discussed herein), the access terminal may select the wireless network (e.g., the home wireless network) that was manually selected by the user while in that mode. Advantageously, the selection of the wireless network may be performed automatically, without intervention of the user (e.g., without requiring the user to perform another manual selection).

The coverage re-entry operations described above at FIG. 5 also may be employed in conjunction with the operations of FIG. 6. For example, if the access terminal returns to the coverage of the CSG within a defined period of time after leaving coverage at block 612, the access terminal may automatically select a cell of the CSG as discussed above.

FIG. 7 illustrates several sample components that may be incorporated into a node such as an access terminal 700 (e.g., corresponding to the access terminal 102) to perform mode switch and network selection as taught herein. The described components also may be incorporated into other nodes in a communication system. For example, other nodes in a system may include components similar to those described for the access terminal 700 to provide similar functionality. A given node may contain one or more of the described components. For example, an access terminal may contain multiple transceiver components that enable the access terminal to operate on multiple frequencies and/or communicate via different technologies.

As shown in FIG. 7, the access terminal 700 includes a transceiver 702 for communicating with other nodes. The transceiver 702 includes a transmitter 704 for sending signals (e.g., to an access point) and a receiver 706 for receiving signals (e.g., scanning for signals from an access point).

The access terminal 700 also includes other components that may be used in conjunction with mode switch and network selection operations as taught herein. For example, the access terminal 700 may include a communication controller 708 for managing communication with other nodes and for providing other related functionality as taught herein. In some aspects, the communication controller may be used to send messages and process received messages for selecting a cell (e.g., receive messages including CSG identifiers, wireless network identifiers, etc.), identifying a wireless network associated with a cell of a CSG, registering with a network, determining whether the access terminal is camping on a cell of CSG, and determining whether the access terminal has returned to wireless coverage of a cell of a CSG (e.g., within a defined period of time).

In addition, the access terminal 700 may include a network selector 710 (e.g., corresponding to mode switch 114) for performing mode switches and network selection operations and for providing other related functionality as taught herein. For example, the network selector 710 may switch modes based on the identification of a wireless network and/or based on a determination that an access terminal is no longer camped on a cell of a CSG, maintain a record of the current mode of wireless network selection, return to a mode identified by the record, select a wireless network based on a determination that an access terminal is no longer camped on a cell of a CSG, designate that a closed CSG is preferred for selection, and return to a wireless network identified by a maintained record if an access terminal leaves wireless coverage of a cell of a CSG.

The access terminal 700 also may include a cell selector 712 (e.g., corresponding to selector 112) for selecting cells and for providing other related functionality as taught herein. For example, the cell selector may select a cell advertising a CSG, and select a cell of a CSG if an access terminal enters wireless coverage of the cell within a defined period of time after the access terminal ceased camping on any cell of the CSG.

The access terminal 700 also may include input and output devices for interfacing with a user. For example, the access point may include a display device 714 and a user input device 716.

The teaching herein may be realized in various ways in different implementations. Two sample implementations are described below in the context of manual selection of a CSG that is on a different PLMN from the PLMN that is currently serving an access terminal.

In the first implementation, the non-automatic mode of wireless network selection described above is referred to as a CSG-triggered mode of operation. In some aspects, the CSG-triggered mode of operation may comprise a manual mode of operation where state information (e.g., indicative of the prior selection mode and/or wireless network) is maintained to facilitate the desired wireless network selection behavior. For example, once a user manually selects a CSG on a different PLMN and the access terminal selects this PLMN, the access terminal may be considered to be in a CSG-triggered mode (e.g., a form of a manual mode of PLMN selection).

In this mode, the access terminal remains camped in the new PLMN until conditions trigger another behavior. For example, when the access stratum (AS) loses coverage on the new PLMN, selection may be triggered as usual. However, at the time of this trigger, the non-access stratum (NAS) behaves as if the previous mode of PLMN selection had been automatic. In most cases, the access terminal will return to the original serving PLMN, but in any event it may select a new PLMN without user intervention.

In some cases, the manual CSG selection may cause specific AS behaviors to be triggered as a result of the request to camp on the selected CSG cell. For example, this may trigger preferential camping on the requested cell.

The AS may maintain state information in conjunction with the selection operations taught herein. For example, the access terminal may maintain a record indicating that the access terminal triggered PLMN selection for the benefit of the specific serving CSG.

In the example just described, the trigger for PLMN selection was the loss of coverage from the PLMN selected in the CSG-triggered procedure. However, other triggers could be employed in the AS (e.g., to stimulate or inhibit triggering of PLMN selection in response to various events specific to the CSG environment).

As one example, the AS could consider the target CSG cell to be special, and could trigger PLMN selection at the next cell reselection. This operational flow may be identical to that described above, with the exception that cell reselection is used as the trigger rather than loss of coverage.

A more sophisticated version of this modification, which may be useful in campus CSG deployments, is for the AS to trigger PLMN selection only upon reselection to a cell not associated with the same CSG. That is, the AS filters reselection events and triggers (automatic) PLMN selection only if it is being forced to leave the user's chosen CSG.

These modifications may create a user-experience problem if the user repeatedly leaves the target cell (or CSG) for a brief period, then returns. This could occur either because of radio conditions or user activity (e.g., going from a store that provides the CSG service to a car parked outside and back). In such situations, the above operations may occur repeatedly, meaning that the user may be "dumped" onto normal macro cell coverage and forced to repeat manual CSG selection after returning to the coverage of the CSG cell. In practice, this scenario may be obtrusive for the user. Moreover, depending on the interaction between the PLMNs, this scenario may be disruptive to services, result in repeated billing, or present other problems. Therefore, as discussed above, it may be desirable for either the NAS or the AS to maintain a supervisory timer when the PLMN selection state is set to CSG-triggered, so that a physical departure from the CSG (e.g., resulting from loss of coverage from the new PLMN, cell reselection, etc.—whatever triggers the AS to request PLMN selection) does not cause PLMN selection until the timer expires.

In some cases, the access terminal may be out of coverage while the supervisory timer is running (depending on the nature of the AS triggering condition). Thus, the length of the timer may be tuned to a value appropriate to the deployment scenario. In some cases the timer may be operator-configurable. For example, the timer could configurable on a per-cell basis. Here, the configuration may be delivered as part of the system information, either on the CSG (which may "know" the most about its deployment environment) or on the neighboring macro cells of various PLMNs (which may have the strongest interest in ensuring a good user experience in interoperation with the CSG). In other cases, however, the timer may be a fixed value in the specification, a user configuration option, or defined in some other way.

In the second implementation, if a user manually selects a CSG cell in a PLMN that is different from the current camped PLMN, the access point may be configured to provide the behavior that follows. In some aspects, provisions are made to determine a period of time during which the access terminal shall prefer to camp on the manually selected CSG cell based on reselection procedures. If the access terminal is in coverage of the CSG on the selected PLMN it will stay there until either: 1) Its subscription to the CSG or the period of time expires; or 2) The user manually selects to another CSG cell or PLMN. If the access terminal moves out of the coverage of the CSG on the selected PLMN it will go back to its previous state where: 1) If it was in manual mode it will go to the last PLMN selected before this PLMN; and 2) If it was in automatic mode it will revert to normal automatic selection. If the access terminal moves into coverage of the CSG on the new PLMN, then: 1) If it is before the period of time expires the access terminal will select that CSG cell even if it is on another PLMN with higher priority, i.e., ignore PLMN selection mode; and 2) If it is after the timer expires then the PLMN selection mode will take precedence in access terminal reselection.

As discussed above, in some aspects the teachings herein may be employed in an environment that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such an environment, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

A node (e.g., an access point) that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage (e.g., coverage within a commercial building) over an area that is smaller than a macro area and larger than a femto area. In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

Figure 8:
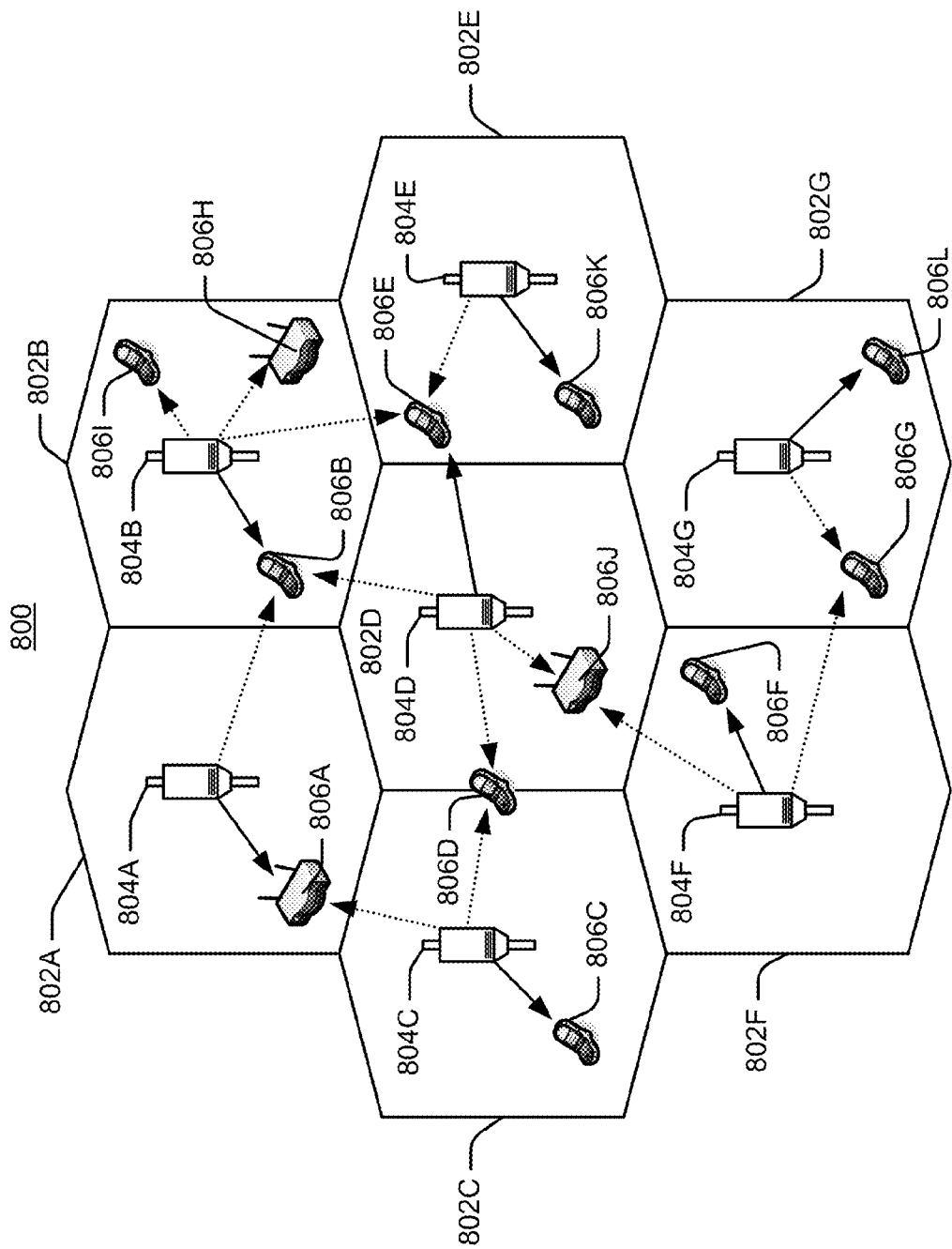
FIG. 8 is a simplified diagram of a wireless communication system.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access point 804 (e.g., access points 804A-804G). As shown in FIG. 8, access terminals 806 (e.g., access terminals 806A-806L) may be dispersed at various locations throughout the system over time. Each access terminal 806 may communicate with one or more access points 804 on a forward link (FL) and/or a reverse link (RL) at a given moment, depending upon whether the access terminal 806 is active and whether it is in soft handoff, for example. The wireless communication system 800 may provide service over a large geographic region. For example, macro cells 802A-802G may cover a few blocks in a neighborhood or several miles in rural environment.

Figure 9:
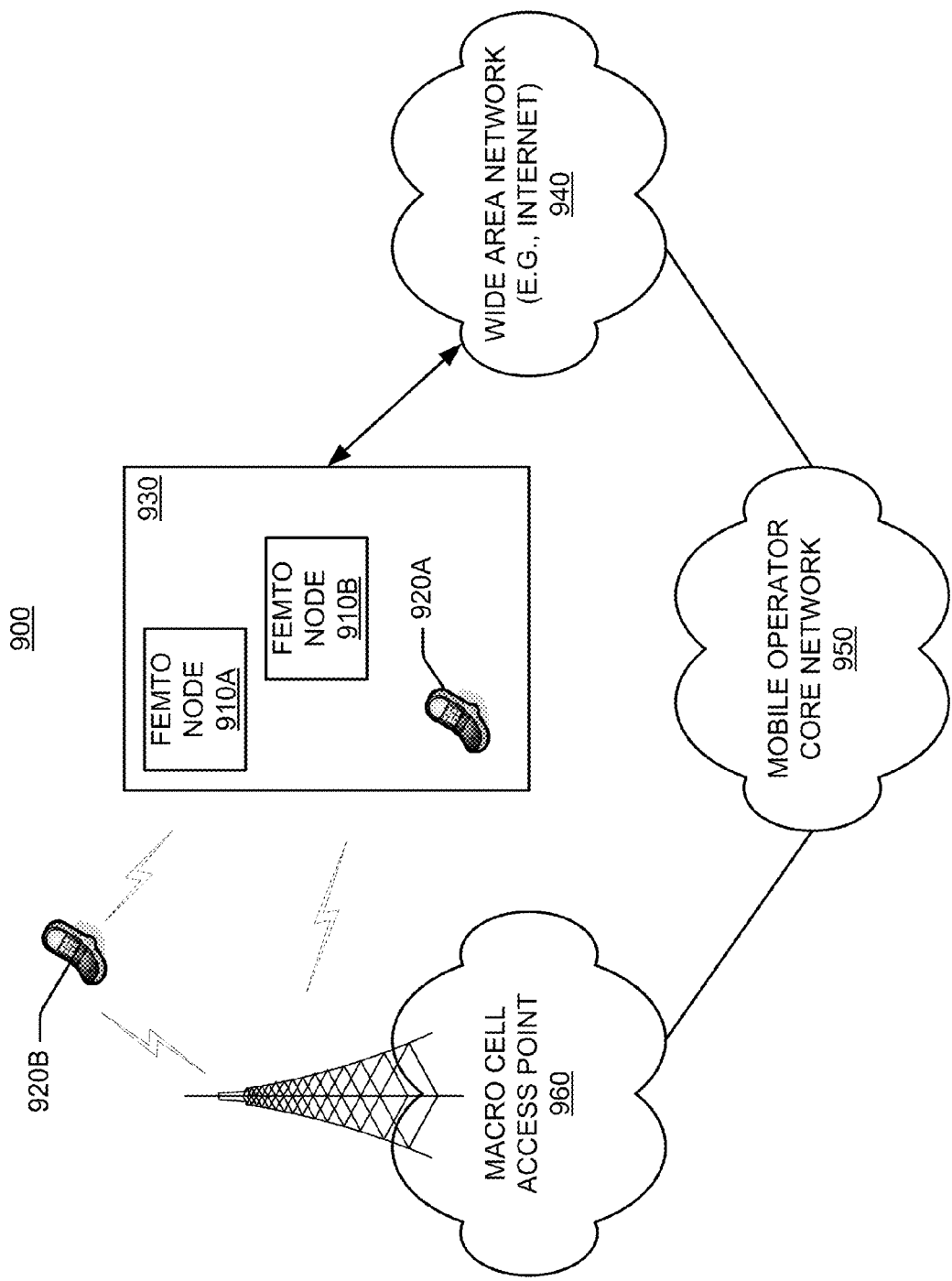
FIG. 9 is a simplified diagram of a wireless communication system including femto nodes.

FIG. 9 illustrates an exemplary communication system 900 where one or more femto nodes are deployed within a network environment. Specifically, the system 900 includes multiple femto nodes 910 (e.g., femto nodes 910A and 910B) installed in a relatively small scale network environment (e.g., in one or more user residences 930). Each femto node 910 may be coupled to a wide area network 940 (e.g., the Internet) and a mobile operator core network 950 via a DSL router, a cable modem, a wireless link, or other connectivity means (not shown). As will be discussed below, each femto node 910 may be configured to serve associated access terminals 920 (e.g., access terminal 920A) and, optionally, other (e.g., hybrid or alien) access terminals 920 (e.g., access terminal 920B). In other words, access to femto nodes 910 may be restricted whereby a given access terminal 920 may be served by a set of designated (e.g., home) femto node(s) 910 but may not be served by any non-designated femto nodes 910 (e.g., a neighbor's femto node 910).

Figure 10:
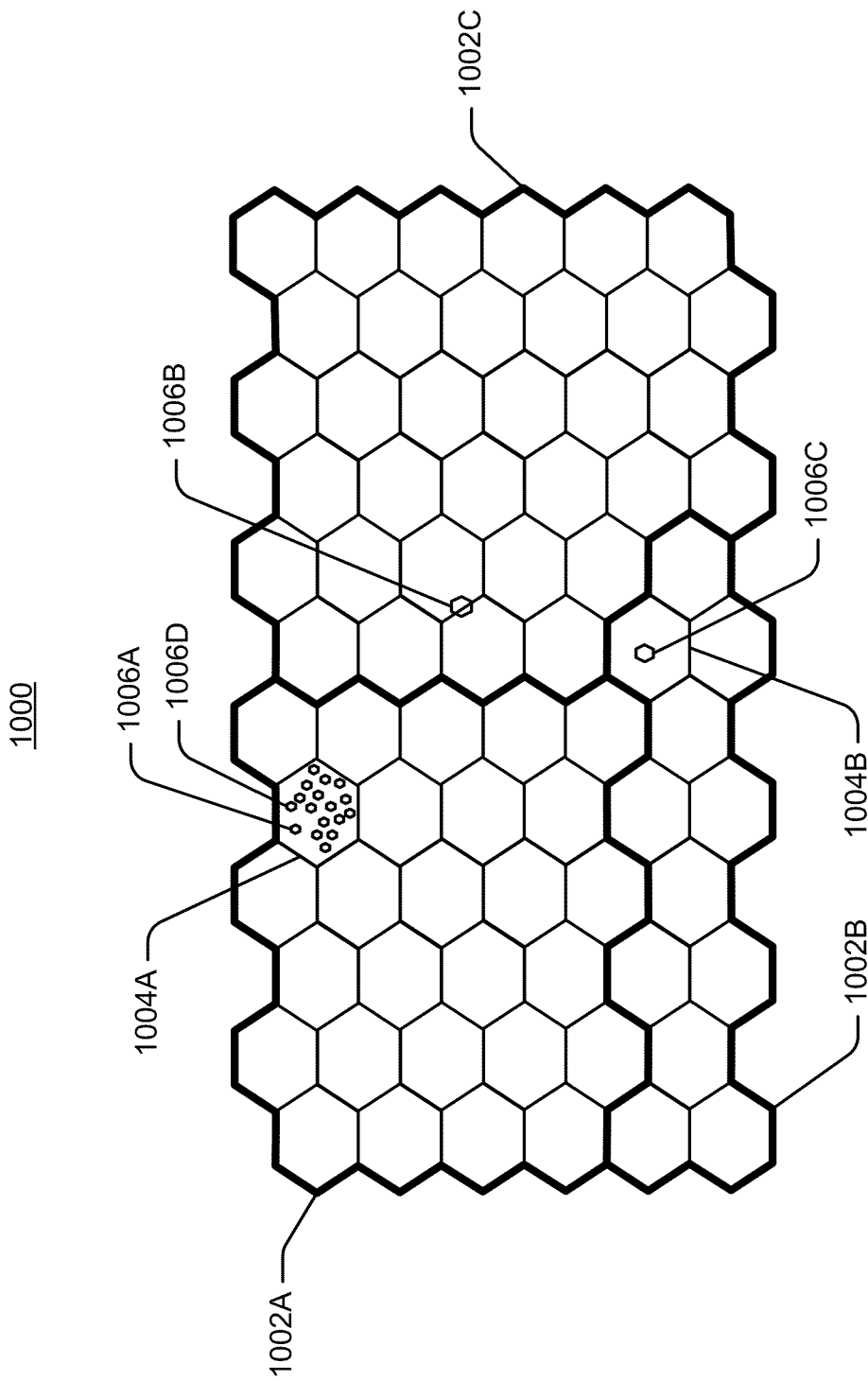
FIG. 10 is a simplified diagram illustrating coverage areas for wireless communication.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the larger hexagons. The tracking areas 1002 also include femto coverage areas 1006. In this example, each of the femto coverage areas 1006 (e.g., femto coverage areas 1006B and 1006C) is depicted within one or more macro coverage areas 1004 (e.g., macro coverage areas 1004A and 1004B). It should be appreciated, however, that some or all of a femto coverage area 1006 may not lie within a macro coverage area 1004. In practice, a large number of femto coverage areas 1006 (e.g., femto coverage areas 1006A and 1006D) may be defined within a given tracking area 1002 or macro coverage area 1004. Also, one or more pico coverage areas (not shown) may be defined within a given tracking area 1002 or macro coverage area 1004.

Referring again to FIG. 9, the owner of a femto node 910 may subscribe to mobile service, such as, for example, 3G mobile service, offered through the mobile operator core network 950. In addition, an access terminal 920 may be capable of operating both in macro environments and in smaller scale (e.g., residential) network environments. In other words, depending on the current location of the access terminal 920, the access terminal 920 may be served by a macro cell access point 960 associated with the mobile operator core network 950 or by any one of a set of femto nodes 910 (e.g., the femto nodes 910A and 910B that reside within a corresponding user residence 930). For example, when a subscriber is outside his home, he is served by a standard macro access point (e.g., access node 960) and when the subscriber is at home, he is served by a femto node (e.g., node 910A). Here, a femto node 910 may be backward compatible with legacy access terminals 920.

A femto node 910 may be deployed on a single frequency or, in the alternative, on multiple frequencies. Depending on the particular configuration, the single frequency or one or more of the multiple frequencies may overlap with one or more frequencies used by a macro access point (e.g., access point 960).

In some aspects, an access terminal 920 may be configured to connect to a preferred femto node (e.g., the home femto node of the access terminal 920) whenever such connectivity is possible. For example, whenever the access terminal 920A is within the user's residence 930, it may be desired that the access terminal 920A communicate only with the home femto node 910A or 910B.

In some aspects, if the access terminal 920 operates within the macro cellular network 950 but is not residing on its most preferred network (e.g., as defined in a preferred roaming list), the access terminal 920 may continue to search for the most preferred network (e.g., the preferred femto node 910) using a better system reselection (BSR), which may involve a periodic scanning of available systems to determine whether better systems are currently available, and subsequent efforts to associate with such preferred systems. With the acquisition entry, the access terminal 920 may limit the search for specific band and channel. For example, one or more femto channels may be defined whereby all femto nodes (or all restricted femto nodes) in a region operate on the femto channel(s). The search for the most preferred system may be repeated periodically. Upon discovery of a preferred femto node 910, the access terminal 920 selects the femto node 910 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 910 that reside within the corresponding user residence 930). In some implementations, a node may be restricted to not provide, for at least one node, at least one of: signaling, data access, registration, paging, or service.

In some aspects, a restricted femto node (which may also be referred to as a closed subscriber group Home NodeB) is one that provides service to a restricted provisioned set of access terminals. This set may be temporarily or permanently extended as necessary. In some aspects, a closed subscriber group identifies subscribers of an operator who are permitted to access one or more cells of a wireless network (e.g., PLMN) but which have restricted access. In some aspects, a closed subscriber group may be defined as the set of access points (e.g., femto nodes) that share a common access control list of access terminals.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A hybrid (or guest) femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
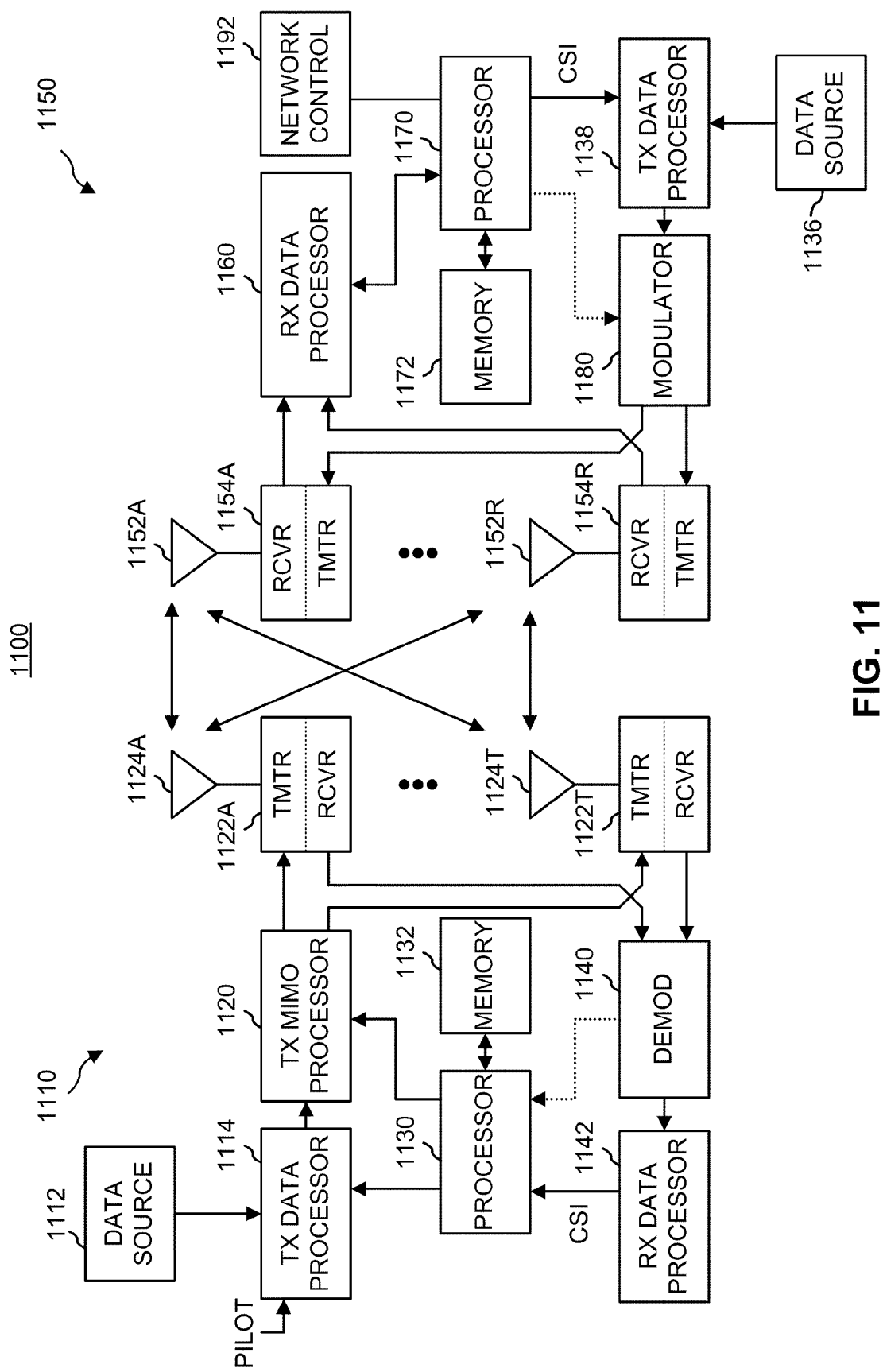
FIG. 11 is a simplified block diagram of several sample aspects of communication components.
Figure 12:
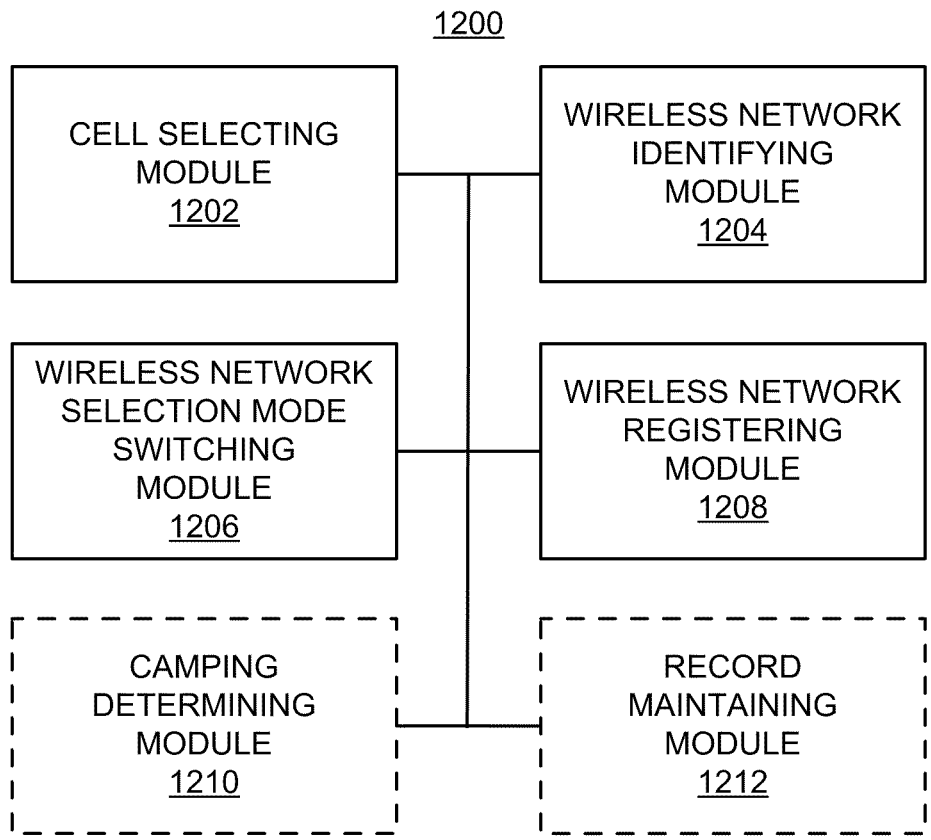
FIGS. 12-15 are simplified block diagrams of several sample aspects of apparatuses configured to provide switching of wireless network selection modes and/or wireless networks as taught herein.
Figure 13:
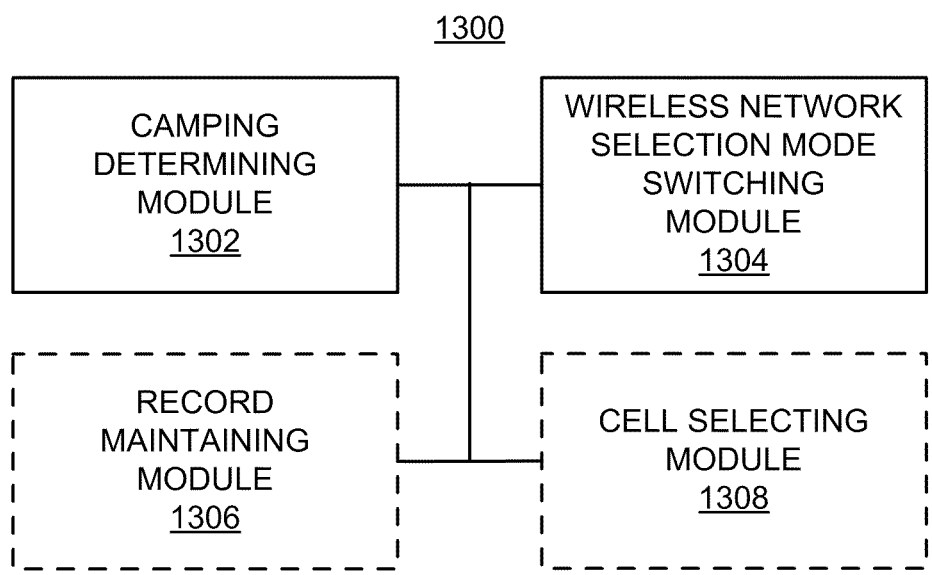
Figure 14:
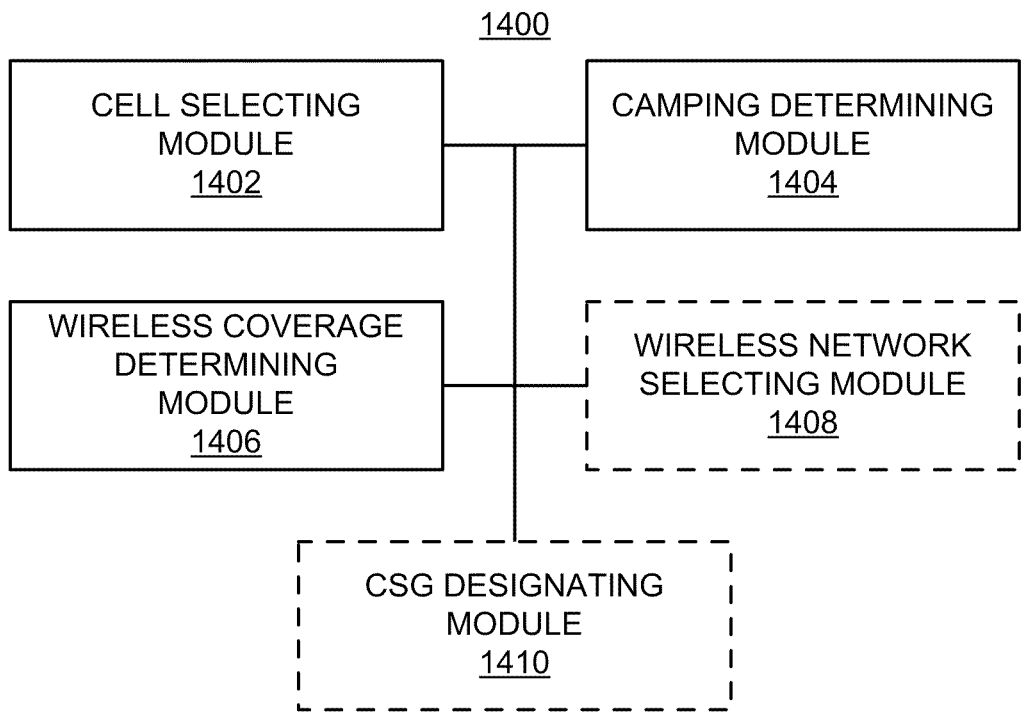
Figure 15:
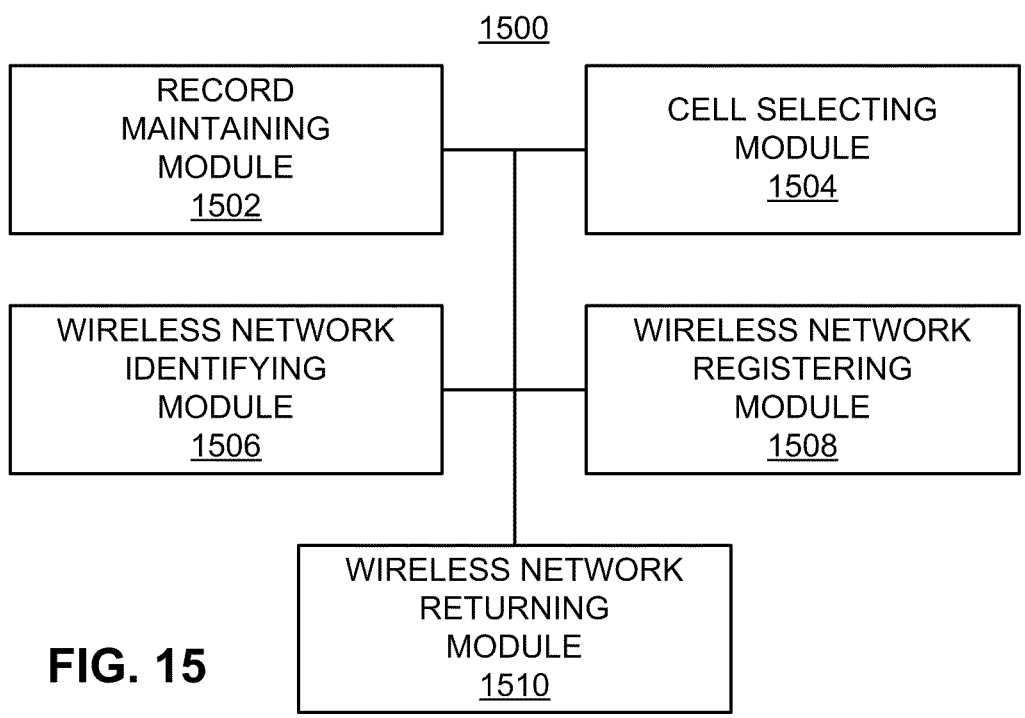

FIG. 11 illustrates a wireless device 1110 (e.g., an access point) and a wireless device 1150 (e.g., an access terminal) of a sample MIMO system 1100. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform network control operations as taught herein. For example, a network control component 1192 may cooperate with the processor 1170 and/or other components of the device 1150 to select network selection modes and wireless networks as taught herein. It should be appreciated that for each device 1110 and 1150 the functionality of two or more of the described components may be provided by a single component. For example, a single processing component may provide the functionality of the network control component 1192 and the processor 1170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 12, 13, 14, and 15, apparatuses 1200, 1300, 1400, and 1500 are represented as a series of interrelated functional modules. Here, a cell selecting module 1202, 1308, or 1402 may correspond at least in some aspects to, for example, a cell selector as discussed herein. A wireless network identifying module 1204 or 1506 may correspond at least in some aspects to, for example, a network selector as discussed herein. A wireless network selection mode switching module 1206 or 1304 may correspond at least in some aspects to, for example, a network selector as discussed herein. A wireless network registering module 1208 or 1508 may correspond at least in some aspects to, for example, a communication controller as discussed herein. A camping determining module 1210, 1302, or 1404 may correspond at least in some aspects to, for example, a communication controller as discussed herein. A record maintaining module 1212, 1306, or 1502 may correspond at least in some aspects to, for example, a network selector as discussed herein. A wireless coverage determining module 1406 may correspond at least in some aspects to, for example, a communication controller as discussed herein. A wireless network selecting module 1408 may correspond at least in some aspects to, for example, a network selector as discussed herein. A CSG designating module 1410 may correspond at least in some aspects to, for example, a network selector as discussed herein. A cell selecting module 1504 may correspond at least in some aspects to, for example, a cell selector as discussed herein. A wireless network returning module 1510 may correspond at least in some aspects to, for example, a network selector as discussed herein.

The functionality of the modules of FIGS. 12-15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 12-15 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:

selecting a cell of a closed subscriber group for camping by an access terminal;

determining, by a processor, that the access terminal is no longer camped on any cell of the closed subscriber group;

determining that the access terminal returned to wireless coverage of the cell or the another cell within a defined period of time after the determination that the access terminal is no longer camped on any cell of the closed subscriber group; and selecting the cell or another cell of the closed subscriber group for camping by the access terminal based on the determination that the access terminal returned to the wireless coverage.

2. The method of claim 1, wherein the closed subscriber group is associated with a first wireless network, the method further comprising selecting a second wireless network in response to the determination that the access terminal is no longer camped on any cell of the closed subscriber group.

3. The method of claim 2, wherein the selection of the cell or the another cell based on the determination comprises reselecting the first wireless network.

4. The method of claim 2, wherein the first and second wireless networks comprise first and second public land mobile networks.

5. The method of claim 1, wherein the selection of the cell of the closed subscriber group for camping by the access terminal comprises:

scanning for available cells advertising at least one closed subscriber group;

displaying a list comprising at least one identifier corresponding to the available cells advertising at least one closed subscriber group; and selecting one of the available cells based on an indication from a user input device.

6. The method of claim 1, wherein:

the access terminal uses a first mode of wireless network selection when the access terminal is camped on the cell;

the access terminal switches to a second mode of wireless network selection after the access terminal is no longer camped on any cell of the closed subscriber group; and the selection of the cell or the another cell of the closed subscriber group comprises returning to the first mode of wireless network selection.

7. The method of claim 6, wherein the second mode of wireless network selection comprises an automatic mode of public land mobile network selection.

8. The method of claim 7, wherein the first mode of wireless network selection comprises a manual mode of public land mobile network selection.

9. The method of claim 1, further comprising designating that the closed subscriber group is preferred for selection, wherein the selection of the cell of the closed subscriber group for camping by the access terminal is based on the designation.

10. The method of claim 1, further comprising:

identifying a first wireless network associated with the selected cell; and registering at the first wireless network.

11. An apparatus for communication, comprising:

a cell selector configured to select a cell of a closed subscriber group for camping by an access terminal; and a communication controller, comprising hardware, configured to determine that the access terminal is no longer camped on any cell of the closed subscriber group, and further configured to determine that the access terminal returned to wireless coverage of the cell or the another cell within a defined period of time after the determination that the access terminal is no longer camped on any cell of the closed subscriber group, wherein the cell selector is further configured to select the cell or another cell of the closed subscriber group for camping by the access terminal based on the determination that the access terminal returned to the wireless coverage.

12. The apparatus of claim 11, wherein the closed subscriber group is associated with a first wireless network, the apparatus further comprising a network selector configured to select a second wireless network in response to the determination that the access terminal is no longer camped on any cell of the closed subscriber group.

13. The apparatus of claim 12, wherein the selection of the cell or the another cell based on the determination comprises reselecting the first wireless network.

14. The apparatus of claim 11, wherein the selection of the cell of the closed subscriber group for camping by the access terminal comprises:

scanning for available cells advertising at least one closed subscriber group;

displaying a list comprising at least one identifier corresponding to the available cells advertising at least one closed subscriber group; and selecting one of the available cells based on an indication from a user input device.

15. The apparatus of claim 11, wherein:

the access terminal uses a first mode of wireless network selection when the access terminal is camped on the cell;

the access terminal switches to a second mode of wireless network selection after the access terminal is no longer camped on any cell of the closed subscriber group; and the selection of the cell or the another cell of the closed subscriber group comprises returning to the first mode of wireless network selection.

16. The apparatus of claim 11, wherein the communication controller is further configured to:

identifying a first wireless network associated with the selected cell; and registering at the first wireless network.

17. An apparatus for communication, comprising:

means for selecting a cell of a closed subscriber group for camping by an access terminal;

means for determining, by a processor, that the access terminal is no longer camped on any cell of the closed subscriber group;

means for determining that the access terminal returned to wireless coverage of the cell or the another cell within a defined period of time after the determination that the access terminal is no longer camped on any cell of the closed subscriber group; and means for selecting the cell or another cell of the closed subscriber group for camping by the access terminal based on the determination that the access terminal returned to the wireless coverage.

18. The apparatus of claim 17, wherein the closed subscriber group is associated with a first wireless network, the apparatus further comprising means for selecting a second wireless network in response to the determination that the access terminal is no longer camped on any cell of the closed subscriber group.

19. The apparatus of claim 18, wherein the selection of the cell or the another cell based on the determination comprises reselecting the first wireless network.

20. The apparatus of claim 17, wherein the selection of the cell of the closed subscriber group for camping by the access terminal comprises:
 scanning for available cells advertising at least one closed subscriber group;
 displaying a list comprising at least one identifier corresponding to the available cells advertising at least one closed subscriber group; and
 selecting one of the available cells based on an indication from a user input device.

21. The apparatus of claim 17, wherein:
 the access terminal uses a first mode of wireless network selection when the access terminal is camped on the cell;
 the access terminal switches to a second mode of wireless network selection after the access terminal is no longer camped on any cell of the closed subscriber group; and
 the selection of the cell or the another cell of the closed subscriber group comprises returning to the first mode of wireless network selection.

22. The apparatus of claim 17, further comprising:
 means for identifying a first wireless network associated with the selected cell; and
 means for registering at the first wireless network.

23. A computer-program product, comprising:
 a non-transitory computer-readable medium comprising code for causing a computer to:
 select a cell of a closed subscriber group for camping by an access terminal;
 determine that the access terminal is no longer camped on any cell of the closed subscriber group;
 determine that the access terminal returned to wireless coverage of the cell or the another cell within a defined period of time after the determination that the access terminal is no longer camped on any cell of the closed subscriber group; and
 select the cell or another cell of the closed subscriber group for camping by the access terminal based on the determination that the access terminal returned to the wireless coverage.

24. The computer-program product of claim 23, wherein the closed subscriber group is associated with a first wireless network, the computer-readable medium further comprising code for causing the computer to select a second wireless network in response to the determination that the access terminal is no longer camped on any cell of the closed subscriber group.

25. The computer-program product of claim 24, wherein the selection of the cell or the another cell based on the determination comprises reselecting the first wireless network.

26. The computer-program product of claim 23, wherein the selection of the cell of the closed subscriber group for camping by the access terminal comprises:
 scanning for available cells advertising at least one closed subscriber group;
 displaying a list comprising at least one identifier corresponding to the available cells advertising at least one closed subscriber group; and
 selecting one of the available cells based on an indication from a user input device.

27. The computer-program product of claim 23, wherein:
 the access terminal uses a first mode of wireless network selection when the access terminal is camped on the cell;
 the access terminal switches to a second mode of wireless network selection after the access terminal is no longer camped on any cell of the closed subscriber group; and
 the selection of the cell or the another cell of the closed subscriber group comprises returning to the first mode of wireless network selection.

28. The computer-program product of claim 23, wherein the code further causes the computer to:
 identifying a first wireless network associated with the selected cell; and
 registering at the first wireless network.

29. A method of communication, comprising:
 maintaining a record of a current wireless network;
 selecting a cell advertising a closed subscriber group;
 identifying, by a processor, a wireless network associated with the selected cell;
 registering at the identified wireless network; and
 returning to the wireless network identified by the record upon leaving wireless coverage of the cell or another cell of the selected closed subscriber group.

30. The method of claim 29, wherein the registration is performed as a result of a determination that the identified wireless network is different than the current wireless network.

31. The method of claim 29, wherein the registration is performed as a result of a determination that the identified wireless network is different than a currently preferred wireless network.

32. The method of claim 29, wherein the identified wireless network comprises a public land mobile network.

33. The method of claim 29, wherein the selection of the cell comprises:
 scanning for available cells advertising at least one closed subscriber group;
 displaying a list comprising at least one identifier corresponding to the available cells advertising at least one closed subscriber group; and
 selecting one of the available cells based on an indication from a user input device.

34. The method of claim 29, wherein the return to the wireless network identified by the record is predicated on whether a manual public land mobile network selection state was in use when the cell was selected.

35. The method of claim 29, further comprising selecting the cell or another cell of the closed subscriber group for establishing communication if wireless coverage of the cell or the another cell is entered within a defined period of time after the access terminal leaves the wireless coverage.

36. The method of claim 29, wherein:
 the current wireless network comprises a home wireless network; and
 the identified wireless network comprises a visited wireless network.

37. An apparatus for communication, comprising:
 a network selector configured to maintain a record of a current wireless network; a cell selector configured to select a cell advertising a closed subscriber group; and
 a communication controller, comprising hardware, configured to identify a wireless network associated with the selected cell, and further configured to register at the identified wireless network,
 wherein the network selector is further configured to return to the wireless network identified by the record upon leaving wireless coverage of the cell or another cell of the selected closed subscriber group.

38. The apparatus of claim 37, wherein the registration is performed as a result of a determination that the identified wireless network is different than the current wireless network.

39. The apparatus of claim 37, wherein the identified wireless network comprises a public land mobile network.

40. The apparatus of claim 37, wherein the selection of the cell comprises:
scanning for available cells advertising at least one closed subscriber group;
displaying a list comprising at least one identifier corresponding to the available cells advertising at least one closed subscriber group; and
selecting one of the available cells based on an indication from a user input device.

41. The apparatus of claim 37, wherein the return to the wireless network identified by the record is predicated on whether a manual public land mobile network selection state was in use when the cell was selected.

42. An apparatus for communication, comprising:
means for maintaining a record of a current wireless network;
means for selecting a cell advertising a closed subscriber group;
means for identifying, by a processor, a wireless network associated with the selected cell;
means for registering at the identified wireless network; and
means for returning to the wireless network identified by the record upon leaving wireless coverage of the cell or another cell of the selected closed subscriber group.

43. The apparatus of claim 42, wherein the registration is performed as a result of a determination that the identified wireless network is different than the current wireless network.

44. The apparatus of claim 42, wherein the identified wireless network comprises a public land mobile network.

45. The apparatus of claim 42, wherein the selection of the cell comprises:
scanning for available cells advertising at least one closed subscriber group;
displaying a list comprising at least one identifier corresponding to the available cells advertising at least one closed subscriber group; and
selecting one of the available cells based on an indication from a user input device.

46. The apparatus of claim 42, wherein the return to the wireless network identified by the record is predicated on whether a manual public land mobile network selection state was in use when the cell was selected.

47. A computer-program product, comprising:
a non-transitory computer-readable medium comprising code for causing a computer to:
maintain a record of a current wireless network; select a cell advertising a closed subscriber group;
identify a wireless network associated with the selected cell;
register at the identified wireless network; and
return to the wireless network identified by the record upon leaving wireless coverage of the cell or another cell of the selected closed subscriber group.

48. The computer-program product of claim 47, wherein the registration is performed as a result of a determination that the identified wireless network is different than the current wireless network.

49. The computer-program product of claim 47, wherein the identified wireless network comprises a public land mobile network.

50. The computer-program product of claim 47, wherein the selection of the cell comprises:
scanning for available cells advertising at least one closed subscriber group;
displaying a list comprising at least one identifier corresponding to the available cells advertising at least one closed subscriber group; and
selecting one of the available cells based on an indication from a user input device.

51. The computer-program product of claim 47, wherein the return to the wireless network identified by the record is predicated on whether a manual public land mobile network selection state was in use when the cell was selected.

* * * * *